United States Patent
Kim et al.

(10) Patent No.: US 10,909,428 B2
(45) Date of Patent: Feb. 2, 2021

(54) DEVICE AND METHOD FOR PROCESSING METADATA

(71) Applicant: Samsung Electronics Co., Ltd., Suwon-si (KR)

(72) Inventors: Woo-Chan Kim, Seoul (KR); Jun-Seok Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/774,093

(22) PCT Filed: Nov. 9, 2016

(86) PCT No.: PCT/KR2016/012871
§ 371 (c)(1),
(2) Date: May 7, 2018

(87) PCT Pub. No.: WO2017/082630
PCT Pub. Date: May 18, 2017

(65) Prior Publication Data
US 2018/0330204 A1    Nov. 15, 2018

(30) Foreign Application Priority Data

Nov. 11, 2015 (KR) .................. 10-2015-0158197

(51) Int. Cl.
*G06K 9/62* (2006.01)
*G06F 16/35* (2019.01)
(Continued)

(52) U.S. Cl.
CPC .......... *G06K 9/6288* (2013.01); *G06F 16/00* (2019.01); *G06F 16/284* (2019.01); *G06F 16/35* (2019.01);
(Continued)

(58) Field of Classification Search
CPC ........ G06F 16/00; G06F 16/284; G06F 16/35; G06F 16/58; G06F 16/5854; G06F 16/907; G06K 9/6288; G06T 1/0007
See application file for complete search history.

(56) References Cited

U.S. PATENT DOCUMENTS 8,630,513 B2 * 1/2014 Gokturk ............. G06K 9/00375
382/305
8,750,557 B2 * 6/2014 Ghatare ................. G06Q 30/02
382/100

(Continued)

FOREIGN PATENT DOCUMENTS

KR    10-2008-0040064 A    5/2008
KR    10-2014-0038707 A    3/2014
(Continued)

OTHER PUBLICATIONS

Tousch Anne-Marie, et al., "Semantic Hierarchies for Image Annotation: A Suvey", Elsevier, Jun. 7, 2011, pp. 333-345, XP028388716, Palaiseau, France.

(Continued)

*Primary Examiner* — Mekonen T Bekele
(74) *Attorney, Agent, or Firm* — Jefferson IP Law, LLP

(57) ABSTRACT

According to various examples, a method by which an electronic device processes metadata can comprise the steps of: acquiring an image; combining recognition information on the image and information related to the image; and storing the combined information as metadata of the image or providing a service or a function, each of which using the combined information.

18 Claims, 23 Drawing Sheets

(51) Int. Cl.

| | | |
|---|---|---|
| *G06F 16/58* | (2019.01) | |
| *G06F 16/28* | (2019.01) | |
| *G06F 16/907* | (2019.01) | |
| *G06F 16/00* | (2019.01) | |
| *G06F 16/583* | (2019.01) | |
| *G06T 1/00* | (2006.01) | |

(52) U.S. Cl.
CPC .......... *G06F 16/58* (2019.01); *G06F 16/5854* (2019.01); *G06F 16/907* (2019.01); *G06T 1/0007* (2013.01)

(56) References Cited

U.S. PATENT DOCUMENTS

| | | | |
|---|---|---|---|
| 9,785,337 B2 | 10/2017 | Seo et al. | |
| 10,360,479 B2 | 7/2019 | Kim et al. | |
| 2007/0115373 A1* | 5/2007 | Gallagher | G06F 16/58 348/231.3 |
| 2007/0136680 A1 | 6/2007 | Skrenta | |
| 2008/0256100 A1 | 10/2008 | Van De Sluis et al. | |
| 2009/0192967 A1* | 7/2009 | Luo | G06N 7/005 706/47 |
| 2010/0189367 A1* | 7/2010 | van der Merwe | G06K 9/183 382/217 |
| 2011/0085739 A1 | 4/2011 | Zhang et al. | |
| 2011/0190008 A1* | 8/2011 | Eronen | G01C 21/3484 455/456.3 |
| 2012/0207389 A1* | 8/2012 | Ghatare | G06Q 30/02 382/173 |
| 2012/0304125 A1* | 11/2012 | Gokturk | G06K 9/00375 715/825 |
| 2013/0155063 A1* | 6/2013 | Solem | G06K 9/00221 345/420 |
| 2013/0345961 A1* | 12/2013 | Leader | G01C 21/20 701/410 |
| 2014/0015965 A1* | 1/2014 | Dunko | H04N 5/232 348/143 |
| 2014/0026043 A1 | 1/2014 | Takeuchi | |
| 2014/0164974 A1 | 6/2014 | Kim | |
| 2014/0219517 A1* | 8/2014 | Mishra | G06K 9/00241 382/118 |
| 2014/0351709 A1 | 11/2014 | Uno et al. | |
| 2015/0007243 A1 | 1/2015 | Kunkel et al. | |
| 2015/0293942 A1 | 10/2015 | Cady et al. | |
| 2016/0283519 A1 | 9/2016 | Glasgow et al. | |
| 2016/0316219 A1* | 10/2016 | Yuan | H04N 19/137 |
| 2017/0124740 A1* | 5/2017 | Campbell | G06F 3/0482 |
| 2017/0132687 A1 | 5/2017 | Kim et al. | |
| 2017/0177731 A1 | 6/2017 | Okayama et al. | |
| 2017/0286456 A1* | 10/2017 | Wenzel | G06F 16/212 |
| 2018/0267998 A1* | 9/2018 | Albouyeh | G06Q 10/10 |
| 2019/0197365 A1 | 6/2019 | Kim et al. | |
| 2020/0210490 A1* | 7/2020 | Hutchins | G06F 16/285 |

FOREIGN PATENT DOCUMENTS

| | | |
|---|---|---|
| KR | 10-2015-0104646 A | 9/2015 |
| WO | 2009/148422 A1 | 12/2009 |

OTHER PUBLICATIONS

Pooshfam, Hamidreza, et al., "A Web-Based Framework for Resource Sharing and Collaborative Medical Image Annotation", BWCCA, Dec. 14, 2009, pp. 514-519, XP058286263, Kuala Lumpur, Malaysia.

European Office Action dated Sep. 2, 2019, issued in European Application No. 16 864 556.2.

Jelena Tesic IBM T.J. Watson Research Center. Metadata Practices for Consumer Photos. XP011137101. John R. Smith, IBM. Standards. Jul.-Sep. 2005.

U.S. Office Action dated Jul. 15, 2019, issued in U.S. Appl. No. 16/426,650.

U.S. Notice of Allowance dated Sep. 20, 2019, issued in U.S. Appl. No. 16/426,650.

Alaa M. Riad et al., "A Literature Review of Image Retrieval Based on Semantic Concert", International Journal of Computer Applications, vol. 40, No. 11, Dec. 29, 2012.

European Examination Report dated Aug. 14, 2020, issued in European Application No. 16864556.2-1213.

* cited by examiner

|       | WIFE | COLLEAGUE | HOME | COMPANY | ... |
|-------|------|-----------|------|---------|-----|
| WIFE      | X | O | O | O  | ... |
| COLLEAGUE | O | X | O | 21 |     |
| HOME      | O | O | X | O  |     |
| COMPANY   | O | 21 | O | X |     |
| ⋮ |  |  |  |  |  |

MORNING
(731)

FIG.7B

|       | WIFE | COLLEAGUE | HOME | COMPANY | ... |
|-------|------|-----------|------|---------|-----|
| WIFE      | X | O | 67 | O | ... |
| COLLEAGUE | O | X | O  | O |     |
| HOME      | 67 | O | X | O |     |
| COMPANY   | O | O | O | X |     |
| ⋮ |  |  |  |  |  |

EVENING
(733)

FIG.7C

| | Title | Score |
|---|---|---|
| 1438 | PHOTO TAKEN ALONE ON CLEAR DAY IN SPRING LAST YEAR | 8 |
| 1436 | PHOTO TAKEN ALONE ON CLEAR DAY LAST YEAR | 6 |
| 1434 | PHOTO TAKEN ALONE IN SPRING LAST YEAR | 5 |
| 1432 | PHOTO TAKEN ALONE LAST YEAR | 3 |
| | Title Ranking & Selection | |

DEVICE AND METHOD FOR PROCESSING METADATA

TECHNICAL FIELD

The present invention relates to methods for processing metadata of images and electronic devices for the same.

BACKGROUND ART

Conventional electronic devices equipped with a camera may image-process images captured by the camera, compress the processed images and produce images files, and store the produced image files in a memory.

Conventional electronic devices may gather data about images and store the gathered data as metadata for the images.

DETAILED DESCRIPTION OF THE INVENTION

Technical Problem

Conventional electronic devices merely provide metadata as assistant information about images, thus requiring a method for effective use of metadata.

Technical Solution

According to various embodiments, an operation method of an electronic device may comprise obtaining an image, integrating recognition information about the image with information related to the image, and storing the integrated information as metadata of the image or providing a service or a function using the integrated information.

According to various embodiments, an electronic device may comprise a memory and a processor configured to obtain an image, integrate recognition information about the image with information related to the image, and store the integrated information as metadata of the image in the memory or provide a service or a function using the integrated information.

Advantageous Effects

According to various embodiments, there may be provided various services using metadata by gathering various metadata of images and effectively combining/integrating the gathered metadata based on ontology or storing the gathered metadata as ontology.

BRIEF DESCRIPTION OF DRAWINGS

FIGS. 7A, 7B, 7C, and 7D are views illustrating a metadata modeling method on an electronic device according to various embodiments;

MODE FOR CARRYING OUT THE INVENTION

Figure 1:
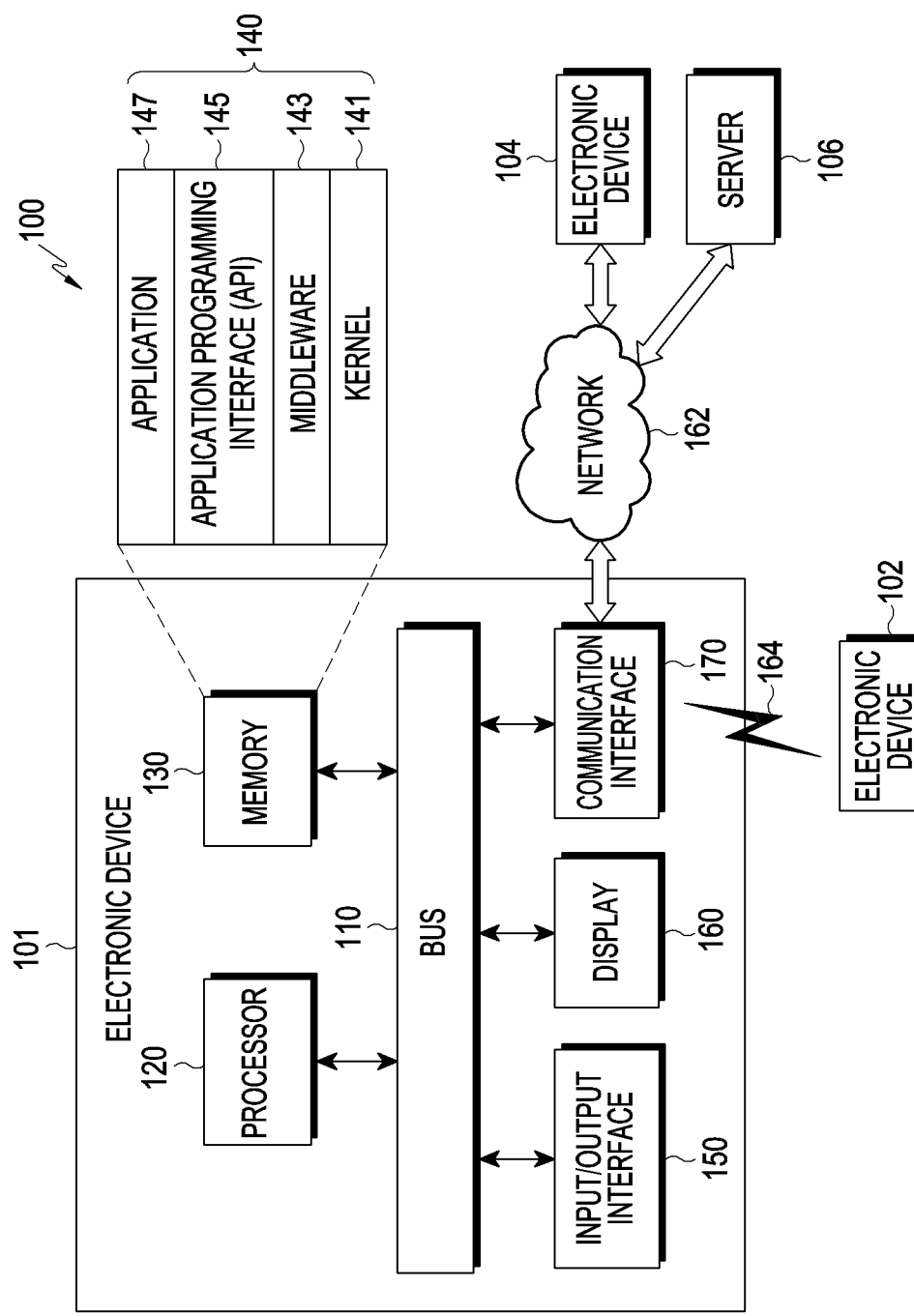
FIG. 1 is a view illustrating an electronic device in a network environment according to various embodiments.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to various embodiments may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device. According to various embodiments, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to some embodiments, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™ PlayStation™), an electronic dictionary, an electronic key, a camcorder, or an electronic picture frame.

According to other embodiments, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler).

According to some embodiments, examples of the electronic device may at least one of part of a piece of furniture or building/structure, an electronic board, an electronic signature receiving device, a projector, or various measurement devices (e.g., devices for measuring water, electricity, gas, or electromagnetic waves). According to various embodiments, the electronic device may be one or a combination of the above-listed devices. According to some embodiments, the electronic device may be a flexible electronic device. The electronic device disclosed herein is not limited to the above-listed devices and may include new electronic devices depending on the development of technology.

Hereinafter, electronic devices are described with reference to the accompanying drawings, according to various embodiments. As used herein, the term "user" may denote a human or another device (e.g., an artificial intelligent electronic device) using the electronic device.

Referring to FIG. 1, according to various embodiments, an electronic device 100 is included in a network environment 101. The electronic device 101 may include a bus 110, a processor 120, a memory 130, an input/output interface 150, a display 160, and a communication module 170 (or communication interface). In some embodiments, the electronic device 101 may exclude at least one of the components or may add another component.

The bus 110 may include a circuit for connecting the components 120, 130, 150, 160, and 170 with one another and transferring communications (e.g., control messages and/or data) between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication. The processor 120 may be denoted a controller, or the processor 120 may include a controller as part thereof or may configure the controller.

The memory 130 may include a volatile and/or non-volatile memory. For example, the memory 130 may store commands or data related to at least one other component of the electronic device 101. According to an embodiment, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication module 170 may set up communication between the electronic device 101 and an external device (e.g., a first electronic device 102, a second electronic device 104, or a server 106). For example, the communication module 170 may be connected with the network 162 through wireless or wired communication to communicate with the external electronic device (e.g., the second external electronic device 104 or server 106). The communication module 170 may include a communication processor (CP), and the communication processor may configure one of a plurality of modules in the communication module 170. According to an embodiment, the communication processor may be included in the processor 120.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. Further, the wireless communication may include, e.g., short-range communication 164. The short-range communication 164 may include at least one of, e.g., wireless fidelity (Wi-Fi), Bluetooth, near-field communication (NFC), or global navigation satellite system (GNSS). The GNSS may include at least one of, e.g., global positioning system (GPS), global navigation satellite system (GLONASS), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment, the server 106 may include a group of one or more servers. According to various embodiments, all or some of operations executed on the electronic device 101 may be executed on another or multiple other electronic devices (e.g., the electronic devices 102 and 104 or server 106). According to an embodiment, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
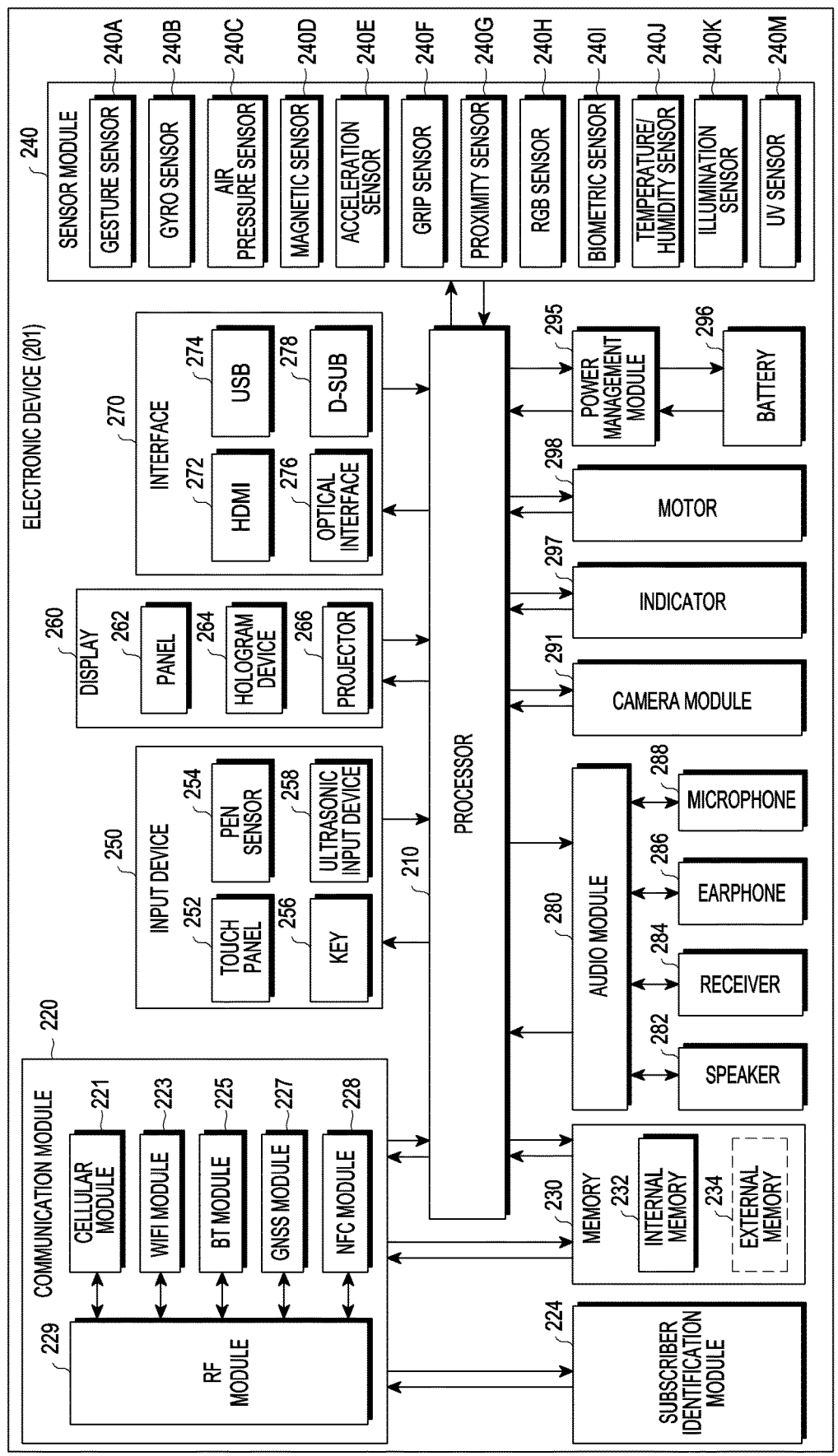
FIG. 2 is a block diagram illustrating an electronic device according to various embodiments.

FIG. 2 is a block diagram illustrating an electronic device 201 according to various embodiments. The electronic device 201 may include the whole or part of the configuration of, e.g., the electronic device 101 shown in FIG. 1. The electronic device 201 may include one or more processors (e.g., application processors (APs)) 210, a communication module 220, a memory 230, a sensor module 240, an input device 250, and a display 260, and the electronic device 201 may further include at least one of a subscription identification module 224, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication module 170 of FIG. 1. The communication module 220 may include at least one of, e.g., a cellular module 221, a wireless fidelity (Wi-Fi) module 223, a Bluetooth (BT) module 225, a GNSS module 227, a NFC module 228, and a RF module 229.

The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment, the cellular module 221 may perform at least some of the functions providable by the processor 210. According to an embodiment, the cellular module 221 may include a communication processor (CP).

The Wi-Fi module 223, the Bluetooth module 225, the GNSS module 227, or the NFC module 228 may include a process for, e.g., processing data communicated through the module. According to some embodiments, at least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amp module (PAM), a frequency filter, a low noise amplifier (LNA), or an antenna. According to another embodiment, at least one of the cellular module 221, the Wi-Fi module 223, the Bluetooth module 225, the GNSS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a mini-SD memory, an extreme digital (xD) memory, a multi-media card (MMC), or a memory Stick™. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to some embodiments, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, and the input device 250 may further include at least one of a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, and the display 260 may further include a hologram device 264 and/or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include at least one of, e.g., a high definition multimedia interface (HDMI) 272, a USB 274, an optical interface 276, or a D-subminiature (D-sub) 278. The interface 270 may be included in e.g., the communication module 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert a sound into an electric signal or vice versa, for example. At least a part of the audio module 280 may be included in e.g., the input/output interface 150 as shown in FIG. 1. The audio module 280 may process sound information input or output through e.g., a speaker 282, a receiver 284, an earphone 286, or a microphone 288.

For example, the camera module 291 may be a device for capturing still images and videos, and may include, according to an embodiment, one or more image sensors (e.g., front and back sensors), a lens, an image signal processor (ISP), or a flash such as an LED or xenon lamp.

The power manager module 295 may manage power of the electronic device 201, for example. According to an embodiment, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave-based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
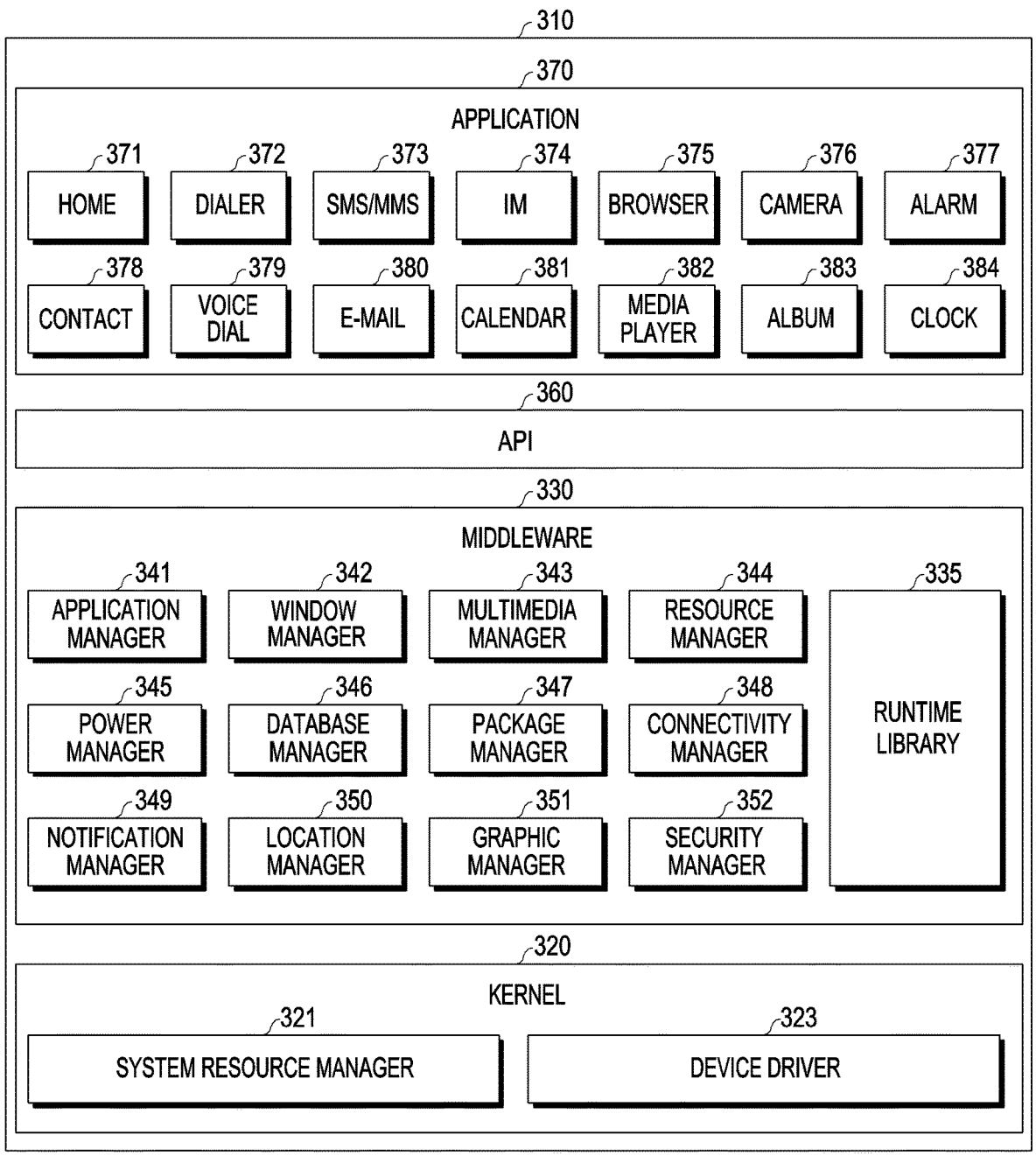
FIG. 3 is a block diagram illustrating a program module according to various embodiments.

FIG. 3 is a block diagram illustrating a program module according to various embodiments. According to an embodiment, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android, iOS, Windows, Symbian, Tizen, or Bada.

The program 310 may include, e.g., a kernel 320, middleware 330, an application programming interface (API) 360, and/or an application 370. At least a part of the program module 310 may be preloaded on the electronic device or may be downloaded from an external electronic device (e.g., at least one of the electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370, according to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage graphical user interface (GUI) resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an embodiment, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment, the application 370 may include an application (e.g., a health-care application of a mobile medical device) designated according to an attribute of the external electronic device (e.g., the electronic devices 102 and 104). According to an embodiment, the application 370 may include an application received from the external electronic device (e.g., the server 106 or electronic devices 102 and 104). According to an embodiment, the application 370 may include a preloaded application or a third-party application downloadable from a server. The names of the components of the program module 310 according to the shown embodiment may be varied depending on the type of operating system.

According to various embodiments, at least a part of the program module 310 may be implemented in software, firmware, hardware, or in a combination of two or more thereof At least a part of the programming module 310 may be implemented (e.g., executed) by e.g., a processor (e.g., the processor 210). At least a part of the program module 310 may include e.g., a module, program, routine, set of commands, process, or the like for performing one or more functions.

Figure 4:
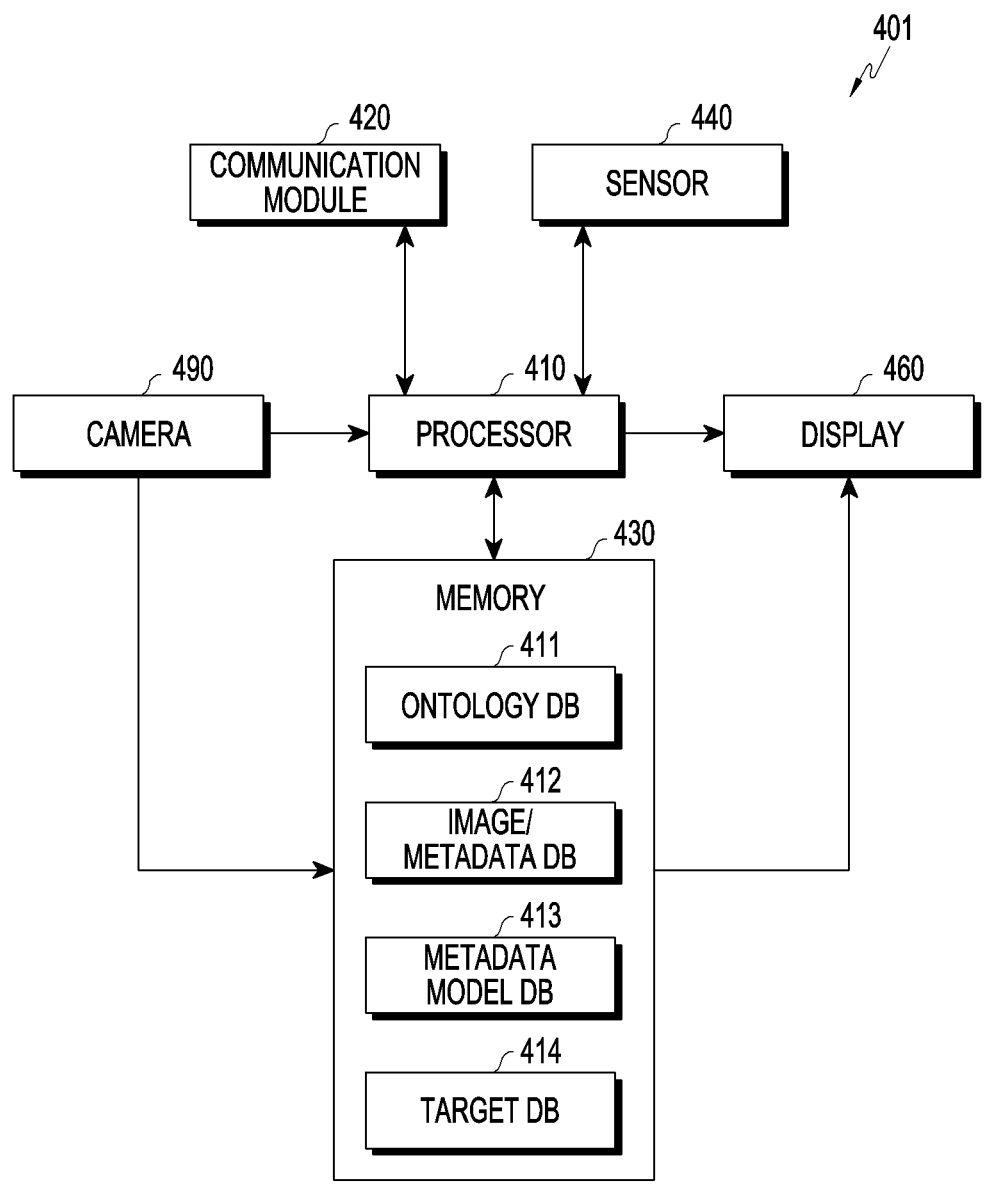
FIG. 4 is a view illustrating main components of an electronic device for performing a metadata processing method.

FIG. 4 is a view illustrating main components of an electronic device for performing a metadata processing method.

The electronic device 401 (e.g., the electronic device 101 or 201) may include, e.g., a camera 490 (e.g., the camera module 291), a memory 430 (e.g., the memory 130 or 230), a display 460 (e.g., the display 160 or 260), a sensor 440 (e.g., at least one of the sensor module 240, the touch panel 252, the GNSS module 227, and the microphone 288), a communication module 420 (e.g., the communication module 170 or 220), and a processor 410 (e.g., the processor 120 or 210).

The camera 490 may capture object(s) in front or behind the electronic device 401 and output the captured image(s) of the object(s). For example, the camera 490 may include a first camera module (or back face/rear camera module) for capturing an object behind the electronic device 401 and a second camera module (or front face/front camera module) for capturing an object in front of the electronic device 401. For example, each camera module may capture still images or video under the control of the processor 410 and output the captured still images or video to the processor 410 or memory 430. The processor 410 may store the captured still images or video in the memory 430 or display them on the display 460. For example, each camera module may produce a preview image (or live preview image) for the target in front or behind and output the produced preview image to the processor 410 or the display 460. The processor 410 may display the preview image on the display 460. For example, the processor 410 may display images retained in the memory 430 on the display 460.

The display 460 may display images, signals, data, or information input from the camera 490, the memory 430, or the processor 410 on the screen.

The memory 430 may include an ontology database 411, an image/metadata database 412, a metadata model database 413, and a target database 414. The image/metadata database 412, the ontology database 411, and the metadata model database 413 may be parts of one database. The ontology database 411 and the metadata model database 413 may be parts of one database. At least part of the ontology database 411 and the metadata model database 413 may be integrated with the image/metadata database 412. The databases 411 to 414 may be parts of at least one database. The ontology and metadata model may be regarded as metadata or part of metadata.

The ontology database 411 may include a plurality of ontologies, and each ontology may include a plurality of information/data elements and data defining the relation among the plurality of information/data elements.

For example, the ontology, as a data model specifying a particular domain, may be composed of a set of concepts (or information/data elements) belonging to a particular domain and formal words specifying the relation among the concepts. An ontology, a set of words written in a formal language may be used for deduction and inference. For example, the ontology may include Class that indicates the name or category of a thing or concept, Instance that indicates a specific item or incident, a substantial form of representation of a thing or concept, Property, a connection between a class or instance and a particular value to represent a particular nature or propensity of the class or instance, and Relation that indicates relations (e.g., at least one of an inclusive relation, identical relation, and causal relation) present among classes or instances. At this time, Property may be included in Relation.

The ontology database 411 may have various data structures. For example, the plurality of information/data elements may be represented in the form of a data/object tree according to the relation among the plurality of information/data elements or as multiple records specifying the plurality of information/data elements and the relation among the plurality of information/data elements.

As an example of the ontology database 411, the ontology database 411 may store a plurality of information in the form of multiple records as set forth below in Table 1.

TABLE 1

| ID | Type | Content | Property | Relation |
|---|---|---|---|---|
| L1 | M1 | N1 | O1 | P1 |
| L2 | M2 | N2 | O2 | P2 |
| L3 | M3 | N3 | O3 | P3 |
| L4 | M4 | N4 | O4 | P4 |
| ... | ... | ... | ... | ... |
| Ln | Mn | Nn | On | Pm |

ID Li ($1 \le i \le n$, where n is an integer not less than 1) denotes unique identification information about the information/data element, type Mi and Content Ni respectively denote identification information about the class/instance and the name of the information/data element, property Oi denotes a particular value, e.g., accuracy, and relation Pi denotes the relation with other information/data elements. Each field in the ontology database 411 may have one or more values; each value may be, e.g., a constant, coordinate, vector, matrix, or text.

For example, the ontology database 411 may include the ontology "[dad]-{married couple}-[mom]." Here, "[dad]" and "[mom]" correspond to information/data elements (or entities), and "{married couple}" corresponds to a relation. Further, the category/topic/class "figure (or people)" in the ontology database 411 to which "[dad]" and "[mom]" may also correspond to an information/data element (or entity).

The image/metadata database 412 may include a plurality of images and a plurality of metadata each corresponding to a respective one of the plurality of images. The plurality of metadata may be stored in the form of a database with a plurality of data records. Each of the plurality of images may be a still image file or video file.

For example, the still image file may have at least one extension of BMP (*.BMP, *.RLE), JPEG (*.JPG), Compuserve GIF (*.GIF), PNG (*.PNG), Photoshop (*.PSD, *.PDD), TIFF (*.TIF), Acrobat PDF (*.PDF), RAW (*.RAW), Illustrator (*.AI), Illustrator, Photoshop EPS (*.EPS), Amiga IFF (*.IFF), FlaschPix (*.FPX), Filmstrip (*.FRM), PCX (*.PCX), PICT File (*.PCT, *.PIC), Pixar (*.PXR), Scitex (*.SCT), or Targa (*.TGA, *.VDA, *.ICB, *.VST).

For example, the video file may include image information and audio information. For example, the video file may have at least one extension of mpeg, mpg, mp4, avi, mov, or mkv. For example, the audio information may be recorded together with an image when the image is captured through the camera 490.

Each of the plurality of metadata may include recognition information about the corresponding image and information related to the image obtained through the camera 490, the memory 430, the sensor 440, and/or the communication module 420.

The metadata model database 413 may include information (or values) or data model indicating the relevancy among common information/data elements in the plurality of metadata.

The target database 414 may be provided to recognize a preset object (or the whole or part of a human or the whole or part of a thing (including a natural thing, such as a cloud, sky, and sea)). Target data for recognizing the object may include, e.g., an image of the object or information about feature points (or also denoted feature images or feature patterns) of the object image. Such feature points may be edges, corners, image patterns, or contours.

In one embodiment, the target data for recognizing the object may include a recognition reference that may be defined by shape characteristics such as the shape/motion/size/color/brightness of a thing/human and as a category such as figures/flowers/sky/pets/buildings.

The sensor 440 may be used to detect user input information or context information indicating the context/condition where an image is captured. For example, the sensor 440 may detect at least one of the target captured, time captured, location/place captured, and ambient sounds when/while being captured.

The communication module 420 may be used to search for images on an external database/system/network or to receive recognition about images from an external device (e.g., the first external electronic device 102, second external electronic device 104, or server 106).

The processor 410 may include at least one of a central processing unit (CPU), an application processor (AP), or a communication processor (CP), an ISP, or a GPU.

The processor 410 may receive images captured by the camera 490 from the camera 490 or read images stored in the memory 430.

In one embodiment, the processor 410 may recognize information included in the image based on the target database 414.

In one embodiment, the processor 410 may transmit the image and/or information related to the image to an external device (e.g., the first external electronic device 102, the second external electronic device 104, or the server 106) and receive recognition information about the image from the external device.

In one embodiment, the processor 410 may detect, through the sensor 440, context information (e.g., at least one of the time captured, location/place captured, or ambient sounds when/while being captured) indicating the context/condition where the image is captured.

In one embodiment, the processor 410 may detect user input information (e.g., at least one of the title, tag, and memo of the image) related to the image through the sensor 440 or the display 460.

In one embodiment, the processor 410 may detect setting information about the camera 490 when/while the image is captured through the camera 490 or the memory 430. For example, the setting information may include at least one of capture start/end/whole time information, capture mode information (e.g., at least one of a nighttime mode, a figure mode, an indoor mode, a facial recognition mode, or a panoramic mode), information about a section/area/portion-of-interest information, or capture rate (or frame rate) information.

The processor 410 may integrate the recognition information with the image-related information based on the ontology database 411 and/or metadata model database 413. The processor 410 may store the integrated information, as metadata of the image, in the image/metadata database 412, the ontology database 411, and/or metadata model database 413 or may provide services or functions using the metadata.

In one embodiment, the services or functions may include at least one of database update functions/services, image discovery/search services, keyword recommending services, image title providing services, and statistical information providing services.

In one embodiment, the target database 414 may store data or information about the composition/arrangement of targets. Such composition information may include information about a plurality of objects, and information about each object may include information about the type (or name) of the object and information about the location, size, direction, and scene category of the object.

The object type information may be, e.g., people, plants, animals, buildings, roads, geography, and nature (e.g., at least one sea, rivers, lakes, or sky).

The object location information may be the location of a representative point (e.g., central point) of the object and locations of corner points defining the object. Such a location may be represented by, e.g., coordinates or a ratio (e.g., a point positioned away from the leftmost end of the image by ⅓ of the overall width of the image or a point positioned away from the top of the image by ⅓ of the overall height of the image).

The object size information may be represented by, e.g., a constant, coordinates (coordinates of the corner points), a ratio (e.g., a point position away from the leftmost end of the image by ⅓ of the whole width of the image or a point positioned away from the top of the image by ⅓ of the whole height of the image).

The object direction information represents the pose, orientation, or direction of the object, e.g., information about the direction where the object faces (e.g., forward, left, right, up, or down). The object direction information may be represented by the two-dimensional or three-dimensional Cartesian coordinate system or five directions including forward, left, right, up, and down or nine directions including forward, left, right, up, down, left-and-up, left-and-down, right-and-up, and right-and-down.

The scene category may represent the category/type (e.g., at least one of a downtown intersection, in front of a crosswalk, a beach, a riverside, or a street/sidewalk in front of or alongside a building) of the overall scene of the image entered.

The target database 414 may have various data structures and may store a plurality of information in the form of multiple records as set forth in, e.g., Table 2 below.

TABLE 2

| Record number | Object type | Object location/size | Object direction | Scene Category |
|---|---|---|---|---|
| A1 | B1 | C1 | D1 | E1 |
| A2 | B2 | C2 | D2 | E1 |
| A3 | B3 | C3 | D3 | E2 |
| A4 | B4 | C4 | D4 | E1/E2 |
| ... | ... | ... | ... | ... |
| An | Bn | Cn | Dn | Em |

Each record $A_i$ ($1 \le i \le n$, where n is an integer not less than 1) includes fields, such as object type $B_i$, object location/size $C_i$, object direction $D_i$, and overall scene category $E_i$. A plurality of object information may correspond to each scene category $E_i$. Each object information piece may include object type $B_i$, a plurality of object locations/sizes $C_i$, and a plurality of object directions $D_i$. m is an integer not less than 1 and smaller than n Each object information piece may correspond to a plurality of scene categories. The object location/size $C_i$ may be represented as the coordinates of diagonal corner points defining the object or as the central position or size of the object. Each field may have one or more values; each value may be, e.g., a constant, coordinate, vector, matrix, or text.

The processor 410 may recognize an object from an image captured by the camera 490 or an image stored in the memory 430. The processor 410 may recognize what the object in the image is through a recognition algorithm as per the type of the object. The processor 410 may also recognize what direction the object faces in what position (i.e., the position and pose of the object).

The processor 410 may estimate the pose by recognizing an object registered in the target database 414 from an input image through an algorithm, such as scale invariant feature transform (SIFT) or speeded up robust features (SURF) and applying a template-based matching method to the recognized object. SIFT is disclosed in "Lowe, David G. (1999). "Object recognition from local scale-invariant features". Proceedings of the International Conference on Computer Vision. 2. pp. 11501157. doi, 10.1109/ICCV.1999.790410," and SURF is disclosed in "Bay, H., Tuytelaars, T., Gool, L. V., "SURF, Speeded Up Robust Features", Proceedings of the ninth European Conference on Computer Vision, May 2006." The pose estimation using template-based matching is disclosed in "Daniel Wagner, Gerhard Reitmayr, Alessandro Mulloni, Tom Drummond, Dieter Schmalstieg, "Real Time Detection and Tracking for Augmented Reality on Mobile Phones," Visualization and Computer Graphics, August 2009." The processor 410 may recognize the object registered in the target database 414 from the input image and estimate the pose of the object based on 2D or 3D object information stored in the target database 414.

The processor 410 may recognize an image area matching the object registered in the target database 414 from the input image. Depending on the type of target recognized, the processor 410 may recognize the object without referring to the target database 414. For example, the processor 410 may detect edge feature points and corner feature points from the input image and recognize a planar object, such as a rectangle, circle, or polygon, defined by the edge feature points and corner feature points.

The processor 410 may search for scene category information matching the composition/arrangement of objects recognized from the target database 414. The processor 410 may detect corresponding scene categories based on the types, locations, and/or directions of the objects.

The processor 410 may recognize the target captured, location/place captured, or other context information based on at least one of information about the recognized objects (e.g., the types, locations, and/or directions of the recognized objects), scene category information about the recognized objects, and location information (e.g., location information through the GNSS module 227 or GPS module) about the electronic device 401.

In one embodiment, the processor 410 may recognize the context information such as the target captured or location/place captured based on identification information and/or strength of a wireless signal (e.g., at least one of a Wi-Fi signal, a Bluetooth (BT) signal, or an NFC signal) received through the communication module 420.

In one embodiment, the processor 410 may obtain information about an indoor capture location using an NFC module (e.g., the NFC module 228) of the communication module 420. For example, where NFC devices (e.g., NFC readers or sensors) are mounted at predetermined intervals in an indoor space or in predetermined positions inside an indoor space (e.g., at the doors or at the corners, lamp, center of the wall, floor or ceiling of each room), the processor 410 may grasp the location of the electronic device 401 by receiving NFC signals through the NFC module or location-related information from the NFC reader which receives NFC signals from the NFC module. For example, further enhanced accuracy may be achieved depending on the interval at which the NFC devices are deployed. The processor 410 may predict the coordinates of the electronic device 401 by grasping the travel distance and direction after detecting NFC signals.

In one embodiment, the processor 410 may determine location information about the electronic device 401 or an object captured by a marker technique. The marker technique is one to grasp the position of a particular marker included in an image by interpreting the marker and to grasp relative positions between the marker and electronic device 401. The marker may be one or more of a barcode, a 2D code (QR code, PDF-417, data matrix, or ColorCode™) or a watermark. The processor 410 may grasp coordinates or direction information by decoding the marker. Since the marker deforms depending on the direction of capture by the camera 490, the location information about the camera may be predicted through the pose or direction information or size information about the electronic device 401 or the location of the marker on the image.

In one embodiment, the target database 414 may include a radio signal fingerprint database that may include information about a distribution of wireless signals in an indoor space (e.g., identification information and strength of wireless signal per position). For example, the processor 410 may receive at least one wireless signal including identification information from an external device through the communication module 420, and the processor 410 may compare and/or match the identification information and strength of the wireless signal with signal information (i.e., identification information and strength) in the wireless signal fingerprint database and may determine the location information about the electronic device 401 from location information in the wireless signal fingerprint database corresponding to the matching signal information.

According to various embodiments, an electronic device may comprise a memory and a processor configured to obtain an image, integrate recognition information about the image with information related to the image, and store the integrated information as metadata of the image in the memory or provide a service or a function using the integrated information.

According to various embodiments, integrating the recognition information with the image-related information may include integrating the recognition information with the image-related information based on a database defining a plurality of information/data elements and a relation among the plurality of information/data elements.

According to various embodiments, the image-related information may be detected by a sensor or communication module of the electronic device.

According to various embodiments, the method may be configured to perform at least one of receiving the image from external device, obtaining the image through capturing by a camera of the electronic device, and reading the image stored in a memory of the electronic device.

According to various embodiments, the image may be a still image or a video.

According to various embodiments, the recognition information may include at least one of identification information about the user included in the image, identification information about a thing included in the image, composition information about objects included in the image, information about text included in the image, and color/chroma/lightness/brightness information about the image.

According to various embodiments, the image-related information may include at least one of context information indicating the capture context/condition for the image, user input information, and search information using an external database/system/network, and the context information may include at least one of time or location captured, ambient sounds when/while being captured, or camera setting information when/while being captured.

According to various embodiments, the method may be configured to recognize an object from the image and receive information about the recognized object from the user.

According to various embodiments, the method may be configured to recognize an object from the image and store information about the recognized object and information about a recognition accuracy/rate in the memory of the electronic device.

According to various embodiments, the method may be configured to recognize an object from the image and search the memory of the electronic device for information about the recognized object.

According to various embodiments, the method may be configured to transmit the image to an external device and receive recognition information about the image from the external device.

According to various embodiments, the method may be configured to access an external database/system/network, search the database/system/network for information about at least part of the image-related information or the image information, and store the searched-for information as part of the image-related information.

According to various embodiments, the image-related information may include text. The method may be configured to split the text into a plurality of text elements based on a database defining a plurality of information/data elements and a relation among the plurality of information/data elements and allow the plurality of text elements to correspond to categories/topics/classes in the database.

According to various embodiments, the method may be configured to produce information (or values) indicating the relevancy among the information/data elements in a plurality of metadata stored in the memory of the electronic device.

According to various embodiments, the method may be configured to determine whether a preset condition is met, and upon meeting the preset condition, produce values indicating the relevancy among the information/data elements in a plurality of metadata stored in the memory of the electronic device.

According to various embodiments, the method may be configured to determine whether a preset condition is met, upon meeting the preset condition, produce values indicating the relevancy among the information/data elements for a plurality of metadata stored in the memory of the electronic device and store the produced values as a data model.

According to various embodiments, the method may be configured to determine whether a preset condition is met, and upon meeting the preset condition, produce values indicating the relevancy among the information/data elements for a plurality of metadata stored in the memory of the electronic device. The preset condition may include at least one of arrival of a preset period, the usage of computing resources of the electronic device being not more than a preset threshold, the remaining battery life of the electronic device being not less than a preset threshold, the passage of a preset time from the last time that a metadata model was produced, the number of new images obtained being not less than a preset threshold, providing a service or function using metadata, receiving a user input, the electronic device booting up, a transition from a sleep mode of the electronic device to a normal mode, the display screen/power-on after entry into the sleep mode of the electronic device, executing an application including a graphical element (or item) (e.g., at least one of a button, icon, menu, or menu item) requiring a metadata model, displaying a screen including a graphical element requiring a metadata model, the user's approach to a graphical element requiring a metadata model, detecting a context associated with the electronic device that matches a preset context, or detecting at least one word matching at least one preset word.

According to various embodiments, the method may be configured to estimate information about the image based on values indicating the relevancy among the information/data elements for a plurality of metadata stored in the memory of the electronic device.

According to various embodiments, the method may be configured to update a database defining a plurality of information/data elements and a relation among the plurality of information/data elements using at least part of the recognition information or the image-related information.

According to various embodiments, the method may be configured to receive at least part of a database defining a plurality of information/data elements and a relation among the plurality of information/data elements from an external device.

According to various embodiments, the method may be configured to determine whether a preset condition is met, and upon meeting the preset condition, transmit at least part of a database defining a plurality of information/data elements and a relation among the plurality of information/data elements to the external device.

According to various embodiments, the method may be configured to classify images stored in the memory of the electronic device into a plurality of categories based on a database defining a plurality of information/data elements and a relation among the plurality of information/data elements and metadata of the images, and upon selecting one of the plurality of categories, display images belonging to the selected category.

According to various embodiments, the method may be configured to classify images stored in the memory of the electronic device into a plurality of categories based on a database defining a plurality of information/data elements and a relation among the plurality of information/data elements and metadata of the images, upon selecting one of the plurality of categories, display images belonging to the selected category, display sub-categories belonging to the selected category, and upon selecting one of the sub-categories, display images belonging to the selected sub-category.

According to various embodiments, the method may be configured to display information/data elements of a first group among a plurality of information/data elements in a database defining the plurality of information/data elements and a relation among the plurality of information/data elements, in response to a first input and display images stored in a memory of the electronic device related to a first information/data element among the information/data elements of the first group, in response to a second input.

According to various embodiments, the method may be configured to display information/data elements of a second group among the plurality of information/data elements related to the first information/data element, in response to a third input and display the images stored in the memory of the electronic device related to the first information/data element and a second information/data element among the information/data elements of the second group, in response to a fourth input.

According to various embodiments, the method may be configured to display, together with the information/data elements of the first group, information/data elements of a third group among the plurality of information/data elements including a third information/data element related to the information/data elements of the first group, in response to the first input.

According to various embodiments, the method may be configured to display, together with the information/data elements of the second group, information/data elements of a fourth group among the plurality of information/data elements including a fourth information/data element related to the information/data elements of the second group, in response to the third input.

According to various embodiments, the information/data elements of the third or fourth group may be displayed on a graphical element that, as rotated, allows any one thereof to be selected.

According to various embodiments, the third input may be a swipe gesture of a preset pattern (e.g., L-shaped or C-shaped).

According to various embodiments, the method may be configured to integrate the text elements of the metadata based on a database defining a plurality of information/data elements and a relation among the plurality of information/data elements and store combinations of the text elements as a title of the image.

According to various embodiments, the method may be configured to integrate the text elements of the metadata based on a database defining a plurality of information/data elements and a relation among the plurality of information/data elements, compare the respective evaluation values for the combinations of the text elements, and determine one of the combinations of the text elements as the title of the image based on the comparison.

According to various embodiments, the method may be configured to receive a keyword and display images including the keyword in the metadata among images stored in the memory of the electronic device, in response to receiving the keyword.

According to various embodiments, the method may be configured to receive a keyword, generate at least one recommended keyword by integrating at least one information/data element in a database defining a plurality of information/data elements and a relation among the plurality of information/data elements, and display the keyword together with the at least one recommended keyword.

According to various embodiments, the method may be configured to display images including the selected recommended keyword in the metadata among images stored in the memory of the electronic device, in response to selecting one of the at least one recommended keyword.

According to various embodiments, the method may be configured to produce statistical information about a plurality of metadata stored in the memory of the electronic device and display the statistical information.

According to various embodiments, the service/function may include at least one of image discovery/search services, keyword recommending services, image title providing services, and statistical information providing services.

Figure 5:
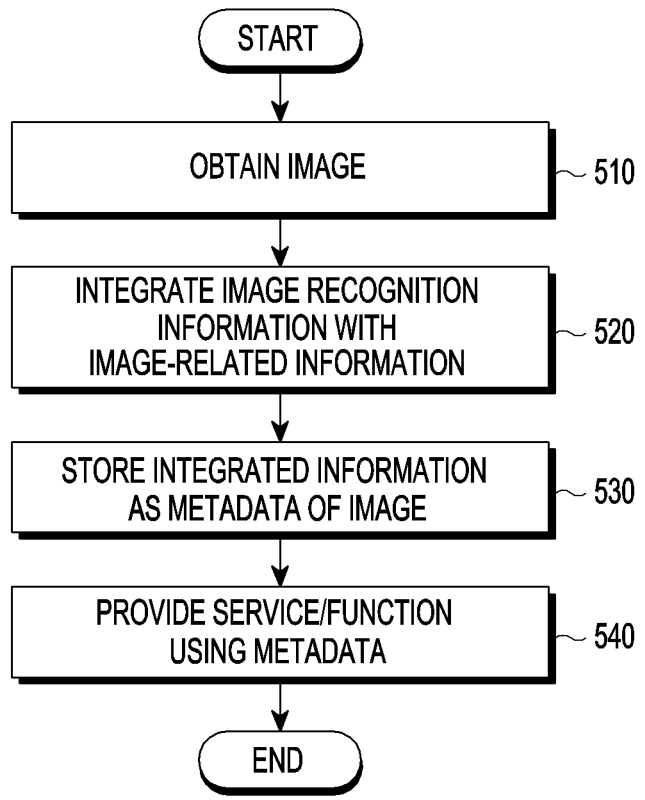
FIG. 5 is a flowchart illustrating a metadata processing method on an electronic device according to various embodiments.

FIG. 5 is a flowchart illustrating a metadata processing method on an electronic device according to various embodiments. The metadata processing method of the electronic device may include operations 510 to 540. The metadata processing method of the electronic device may be performed by at least one of the electronic device (e.g., the electronic device 101, 201, or 401) or a controller or processor (e.g., the processor 120, 210, or 410) of the electronic device.

In operation 510, the electronic device may obtain images.

In one embodiment, the electronic device may obtain an image for an object using a camera (e.g., the camera module 291 or camera 490) functionally connected with the electronic device.

In one embodiment, when/while the image is captured, the electronic device may display, in real-time, the image on a display (e.g., the display 160, 260, or 460) functionally connected with the electronic device or a first area (or a first screen area or first window) of the display.

In one embodiment, the capture of the image may be initiated by receiving a capture command from the user or automatically according to the setting information stored in a memory (e.g., the memory 130, 230, or 430) functionally connected with the electronic device.

In one embodiment, the end of the image capture may be performed by receiving a capture end command from the user or automatically according to the setting information stored in the memory. For example, the electronic device may recommend the capture command and/or the capture end command through an input device (e.g., at least one of the input device 250, the display 160, 260, or 460, the microphone 288, the sensor module 240, or the sensor 440).

In one embodiment, the electronic device may read the image from the memory functionally connected with the electronic device.

In one embodiment, the electronic device may receive the image from an external device (e.g., the electronic device 102 or 104 or the server 106) through a communication module (e.g., the communication module 170, 220, or 420) functionally connected with the electronic device.

In operation 520, the electronic device may integrate recognition information about the image with the image-related information.

In one embodiment, the electronic device may incorporate the recognition information about the image with the image-related information based on a first database (e.g., at least one of the ontology database 411 or the metadata model database 413) defining a plurality of information/data elements and relations among the plurality of information/data elements.

In one embodiment, the recognition information may include at least one of identification information about the user included in the image, identification information about a thing included in the image, composition information about objects included in the image, information about text included in the image, and color/chroma/lightness/brightness information about the image.

In one embodiment, the electronic device may recognize information contained in the image based on a second database (e.g., the target database 414) stored in the memory.

In one embodiment, the electronic device may transmit the image and/or information related to the image to an external device (e.g., the first external electronic device 102, the second external electronic device 104, or the server 106) and receive recognition information about the image from the external device.

In one embodiment, the image-related information may include at least one of context information indicating the capture context/condition for the image, user input information, and search information using an external database/system/network.

In one embodiment, the context information may include at least one of time or location captured, ambient sounds when/while being captured, or setting information about the camera when/while being captured.

In one embodiment, the electronic device may detect context information (e.g., at least one of the time or location/place captured or ambient sounds when/while being captured) indicating the capture context/condition for the image through the communication module or a sensor (e.g., at least one of the sensor 440, the sensor module 240, the touch panel 252, the GNSS module 227, or the microphone 288).

In one embodiment, the electronic device may detect user input information (e.g., at least one of the title, tag, and memo of the image) related to the image through the sensor or the display.

In one embodiment, the electronic device may detect setting information about the camera 490 when/while the image is captured through the camera or the memory.

In one embodiment, the setting information may include at least one of capture start/end/whole time information, capture mode information (e.g., at least one of a nighttime mode, a figure mode, an indoor mode, a facial recognition mode, or a panoramic mode), information about a section/area/portion-of-interest information, or capture rate (or frame rate) information.

In operation 530, the electronic device may store the integrated information, as metadata of the image, in the memory, a third database (e.g., the image/metadata database 412), or the first database (e.g., at least one of the ontology database 411 or the metadata model database 413).

In one embodiment, the electronic device may store the metadata in one image file corresponding to the image.

In one embodiment, the electronic device may store the metadata in a separate file related to the one image file corresponding to the image.

The third database (e.g., the image/metadata database 412) may have various data structures and may store a plurality of metadata in the form of multiple records as set forth below in Table 3 below, for example.

TABLE 3

| Image Identification information | Object Identification information | Composition Information | Context Information | User Input information | Image Description information |
|---|---|---|---|---|---|
| F1 | G1 | H1 | I1 | J1 | K1 |
| F2 | G2 | H2 | I2 | J2 | K2 |
| ... | ... | ... | ... | ... | ... |
| Fn | Gn | Hn | In | Jm | Km |

Each record in the image/metadata database 412 may include fields, such as image identification information Fi (1≤i≤n, where n is an integer not less than 1), object identification information Gi, composition information Hi, context information Ii, user input information Ji, and image description information Ki.

The image identification information Fi may include at least one information piece, such as image name, image ID, or location of image stored. The object identification information Gi may include at least one information piece, such as object type/category, object name/ID, or object recognition rate (or recognition accuracy). The composition information Hi may include at least one information piece, such as number of objects, object type, object position/size, object direction, category of whole scene, or recognition rate (or recognition accuracy) of composition information. The context information Ii may include at least one information piece, such as target, time, or location/place captured, ambient sounds when/while being captured, and information searched in relation with the image. The user input information Ji may include at least one information piece, such as image title, tag, or memo. The image description information (or estimation information) may include at least one information piece, such as image title, description of object/scene/context, or estimation accuracy. Each field may have one or more values; each value may be, e.g., a constant, coordinate, vector, matrix, or text.

In one embodiment, unless the object recognized is one registered in the second database (e.g., the target database 414), the electronic device may display, on the display, a GUI for inquiring the user about identification information such as the type or name of the object, detect a user input (i.e., identification information such as type or name of object) on the GUI, and store the detected user input as the object identification information Gi. Further, the electronic device may assign an object ID to the detected user input and register the object ID and the detected user ID in the second database.

In one embodiment, the electronic device may integrate at least part of the composition information Hi and the object identification information Gi with at least part of the user input information Ji and the context information Ii and produce/estimate the image description information Ki based on the integrated information.

In operation 540, the electronic device may provide services or functions using the metadata (or the integrated information).

In one embodiment, the services or functions may include at least one of image discovery/search services, keyword recommending services, image title/description providing statistical information providing services, or database update functions/services.

In one embodiment, any one of operations 530 and 540 may be omitted or may be performed in the reverse order.

In one embodiment, operation 530 may correspond to one of image discovery/search services, keyword recommending services, image title/description providing services, statistical information providing services, or database update functions.

According to various embodiments, an operation method of an electronic device may comprise obtaining an image, integrating recognition information about the image with information related to the image, and storing the integrated information as metadata of the image or providing a service or a function using the integrated information.

According to various embodiments, integrating the recognition information with the image-related information may include integrating the recognition information with the image-related information based on a database defining a plurality of information/data elements and a relation among the plurality of information/data elements.

According to various embodiments, the method may include at least one of receiving the image from external device, obtaining the image through capturing by a camera of the electronic device, and reading the image stored in a memory of the electronic device.

According to various embodiments, the method may include recognizing an object from the image and receiving information about the recognized object from the user.

According to various embodiments, the method may include recognizing an object from the image and storing information about the recognized object and information about a recognition accuracy/rate in the memory of the electronic device.

According to various embodiments, the method may include recognizing an object from the image and searching the memory of the electronic device for information about the recognized object.

According to various embodiments, the method may include transmitting the image to an external device and receiving recognition information about the image from the external device.

According to various embodiments, the method may include accessing an external database/system/network, searching the database/system/network for information about at least part of the image-related information or the image information, and storing the searched-for information as part of the image-related information.

According to various embodiments, the image-related information may include text. The method may include splitting the text into a plurality of text elements based on a database defining a plurality of information/data elements and a relation among the plurality of information/data elements and allowing the plurality of text elements to correspond to categories/topics/classes in the database.

According to various embodiments, the method may include producing information (or values) indicating the relevancy among the information/data elements in a plurality of metadata stored in the memory of the electronic device.

According to various embodiments, the method may include determining whether a preset condition is met, and upon meeting the preset condition, producing values indicating the relevancy among the information/data elements in a plurality of metadata stored in the memory of the electronic device.

According to various embodiments, the method may include determining whether a preset condition is met, upon meeting the preset condition, producing values indicating the relevancy among the information/data elements for a plurality of metadata stored in the memory of the electronic device and storing the produced values as a data model.

According to various embodiments, the method may be configured to determine whether a preset condition is met, and upon meeting the preset condition, produce values indicating the relevancy among the information/data elements for a plurality of metadata stored in the memory of the electronic device. The preset condition may include at least one of arrival of a preset period, the usage of computing resources of the electronic device being not more than a preset threshold, the remaining battery life of the electronic device being not less than a preset threshold, the passage of a preset time from the last time that a metadata model was produced, the number of new images obtained being not less than a preset threshold, providing a service or function using metadata, receiving a user input, the electronic device booting up, a transition from a sleep mode of the electronic device to a normal mode, the display screen/power-on after entry into the sleep mode of the electronic device, executing an application including a graphical element (or item) (e.g., at least one of a button, icon, menu, or menu item) requiring a metadata model, displaying a screen including a graphical element requiring a metadata model, the user's approach to a graphical element requiring a metadata model, detecting a context associated with the electronic device that matches a preset context, or detecting at least one word matching at least one preset word.

According to various embodiments, the method may include estimating information about the image based on values indicating the relevancy among the information/data elements for a plurality of metadata stored in the memory of the electronic device.

According to various embodiments, the method may include updating a database defining a plurality of information/data elements and a relation among the plurality of information/data elements using at least part of the recognition information or the image-related information.

According to various embodiments, the method may include receiving at least part of a database defining a plurality of information/data elements and a relation among the plurality of information/data elements from an external device.

According to various embodiments, the method may include determining whether a preset condition is met, and upon meeting the preset condition, transmitting at least part of a database defining a plurality of information/data elements and a relation among the plurality of information/data elements to the external device.

According to various embodiments, the method may include classifying images stored in the memory of the electronic device into a plurality of categories based on a database defining a plurality of information/data elements and a relation among the plurality of information/data elements and metadata of the images, and upon selecting one of the plurality of categories, displaying images belonging to the selected category.

According to various embodiments, the method may include classifying images stored in the memory of the electronic device into a plurality of categories based on a database defining a plurality of information/data elements and a relation among the plurality of information/data elements and metadata of the images, upon selecting one of the plurality of categories, displaying images belonging to the selected category, displaying sub-categories belonging to the selected category, and upon selecting one of the sub-categories, displaying images belonging to the selected sub-category.

According to various embodiments, the method may include displaying information/data elements of a first group among a plurality of information/data elements in a database defining the plurality of information/data elements and a relation among the plurality of information/data elements, in response to a first input and displaying images stored in a memory of the electronic device related to a first information/data element among the information/data elements of the first group, in response to a second input.

According to various embodiments, the method may include displaying information/data elements of a second group among the plurality of information/data elements related to the first information/data element, in response to a third input and displaying the images stored in the memory of the electronic device related to the first information/data element and a second information/data element among the information/data elements of the second group, in response to a fourth input.

According to various embodiments, the method may be configured to display, together with the information/data elements of the first group, information/data elements of a third group among the plurality of information/data elements including a third information/data element related to the information/data elements of the first group, in response to the first input.

According to various embodiments, the method may be configured to display, together with the information/data elements of the second group, information/data elements of a fourth group among the plurality of information/data elements including a fourth information/data element related to the information/data elements of the second group, in response to the third input.

According to various embodiments, the method may include integrating the text elements of the metadata based on a database defining a plurality of information/data elements and a relation among the plurality of information/data elements and storing combinations of the text elements as a title of the image.

According to various embodiments, the method may include integrating the text elements of the metadata based on a database defining a plurality of information/data elements and a relation among the plurality of information/data elements, comparing the respective evaluation values for the combinations of the text elements, and determining one of the combinations of the text elements as the title of the image based on the comparison.

According to various embodiments, the method may include receiving a keyword and displaying images including the keyword in the metadata among images stored in the memory of the electronic device, in response to receiving the keyword.

According to various embodiments, the method may include receiving a keyword, generate at least one recommended keyword by integrating at least one information/data element in a database defining a plurality of information/data elements and a relation among the plurality of information/data elements, and displaying the keyword together with the at least one recommended keyword.

According to various embodiments, the method may include displaying images including the selected recommended keyword in the metadata among images stored in the memory of the electronic device, in response to selecting one of the at least one recommended keyword.

According to various embodiments, the method may include producing statistical information about a plurality of metadata stored in the memory of the electronic device and displaying the statistical information.

Figure 6:
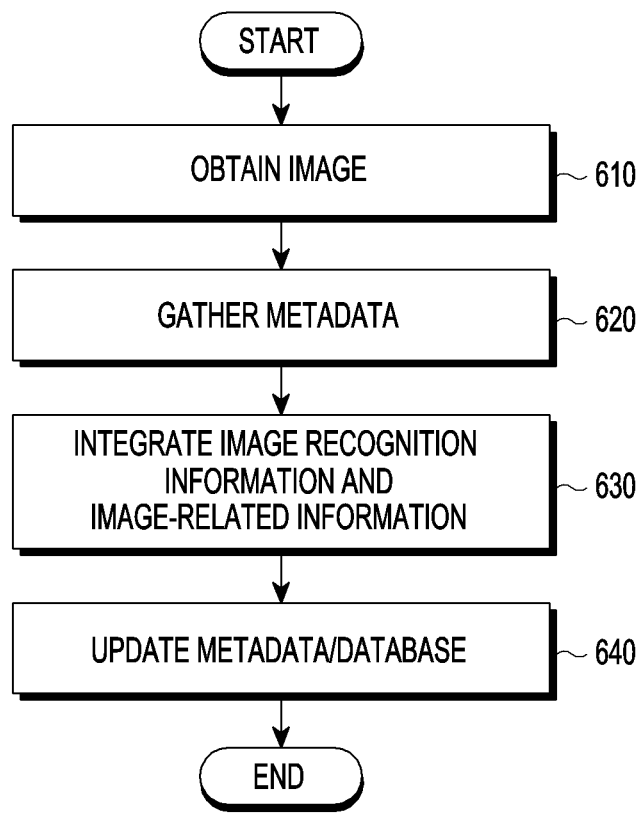
FIG. 6 is a flowchart illustrating a metadata processing method on an electronic device according to various embodiments.

FIG. 6 is a flowchart illustrating a metadata processing method on an electronic device according to various embodiments. The metadata processing method of the electronic device may include operations 610 to 640. The metadata processing method of the electronic device may be performed by at least one of the electronic device (e.g., the electronic device 101, 201, or 401) or a controller or processor (e.g., the processor 120, 210, or 410) of the electronic device.

In operation 610, the electronic device may obtain images.

In operation 620, the electronic device may gather at least one metadata (or information/data elements) through at least one of a camera (e.g., the camera module 291 or the camera 490), a memory (e.g., the memory 130, 230, or 430), a communication module (e.g., the communication module 170, 220, or 420), or a sensor (e.g., at least one of the sensor 440, the sensor module 240, the touch panel 252, the GNSS module 227, or the microphone 288) functionally connected with the electronic device. For example, the gathered metadata may include recognition information about the image and information related to the image.

In one embodiment, the recognition information may include at least one of identification information about the user included in the image, identification information about a thing included in the image, composition information about objects included in the image, information about text included in the image, and color/chroma/lightness/brightness information about the image.

In one embodiment, the image-related information may include at least one of context information indicating the capture context/condition for the image, user input information, and search information using an external database/system/network.

In operation 630, the electronic device may integrate recognition information about the image with the image-related information.

In one embodiment, the electronic device may incorporate the recognition information about the image with the image-related information based on a first database (e.g., at least one of the ontology database 411 or the metadata model database 413) defining a plurality of information/data elements and relations among the plurality of information/data elements.

In operation 640, the electronic device may store the integrated information, as metadata of the image, in the memory (e.g., at least one of the image/metadata database 412, the ontology database 411, or metadata model database 413) or may provide services or functions using the metadata (or the integrated information).

For example, the first database (e.g., at least one of the ontology database 411 or the metadata model database 413) may include the ontology "[dad]-{married couple}-[mom]." Here, "[dad]" and "[mom]" correspond to information/data elements (or entities), and "{married couple}" corresponds to a relation. Further, the ontology "[dad]-{married couple}-[mom]" may correspond to a general-purpose ontology.

In one embodiment, the electronic device may receive the general-purpose ontology from an external device (e.g., the first external device 102, the second external device 104, or the server 106) through the communication module. The electronic device may store/integrate the general-purpose ontology in/with the first database.

In one embodiment, the electronic device may obtain an image through the camera and receive the tag "my dad Chulsoo, married couple photo" through the sensor from the user. The electronic device may recognize two figures, i.e., an unknown figure and the dad registered in the second database (e.g., the target database 414) based on the second database (the target database 414). The electronic device may tokenize the tag "my dad Chulsoo, married couple photo" into "my"-"dad"-"Chulsoo"-"married couple"-"photo" and produce/derive the updated ontology "[Chulsoo]-{same figure}-[dad]-{married couple}-[mom]" by a named entity recognition (NER) process that enables "dad" and "Chulsoo" to correspond to the categories/topics/classes "figures (or people)" and "names" in the first database. Here, the portion or updated ontology "[Chulsoo]-{same figure}-[dad]" may correspond to a private ontology, and the tokenizing and NER processes may be called natural language understanding (NLU) processes. The electronic device may update the first database by replacing the general-purpose ontology with the private ontology in the first database or adding the private ontology to the general-purpose ontology.

In one embodiment, the electronic device may perceive the unknown figure as the "mom" based on the tag and the first database and register the identification information "mom" and the image or the mom's portion in the image in the second database. Further, the electronic device may change the tag "my dad Chulsoo, married couple photo" into the tag "my dad Chulsoo, my mom, married couple photo" and may store in the third database (e.g., the image/metadata database 412) or the tag "my dad Chulsoo, my mom, married couple photo," as separate image description information, in the third database.

In one embodiment, the second database may have dad Chulsoo, mom Younghee registered therein. The electronic device may produce/derive the updated ontology "[Chulsoo]-{same figure}-[dad]-{married couple}-[mom]-{same figure}-[Younghee]" through the tokenizing and NLU processes based on the second database and the tag "my dad Chulsoo, married couple photo." Further, the electronic device may change the tag "my dad Chulsoo, married couple photo" into the tag "my dad Chulsoo, my mom Younghee, married couple photo" and may store in the third database or the tag "my dad Chulsoo, my mom Younghee, married couple photo," as separate image description information, in the third database.

In one embodiment, the electronic device may receive the tag "my dad Chulsoo" from the user, and the second database may have dad Chulsoo, mom Younghee registered therein. The electronic device may produce/derive the updated ontology "[Chulsoo]-{same figure}-[dad]-{married couple}-[mom]-{same figure}-[Younghee]" through the tokenizing and NLU processes based on the second database and the tag "my dad Chulsoo." Further, the electronic device may change the tag "my dad Chulsoo" into the tag "my dad Chulsoo, my mom Younghee" or "my dad Chulsoo, my mom Younghee, married couple photo" and may store in the third database or the tag "my dad Chulsoo, my mom Younghee" or "my dad Chulsoo, my mom Younghee, married couple photo" as separate image description information, in the third database.

In one embodiment, the electronic device may receive the tag "my papa" from the user, and the second database may have dad Chulsoo, mom Younghee registered therein. The electronic device may produce/derive the updated ontology "[Chulsoo]-{same figure}-[papa]-{same figure}-[dad]-{married couple}-[mom]-{same figure}-[Younghee]" through the tokenizing and NLU processes based on the second database and the tag "my papa." Further, the electronic device may change the tag "my papa" into the tag "my papa Chulsoo, my mom Younghee" or "my papa Chulsoo, my mom Younghee, married couple photo" and may store in the third database or the tag "my papa Chulsoo, my mom Younghee" or "my papa Chulsoo, my mom Younghee, married couple photo" as separate image description information, in the third database. For example, where the electronic device is unable to recognize "papa" in the tokenizing and NLU processes, the electronic device may produce/derive the updated ontology by displaying a GUI including the inquiry "What's papa?" and receiving the user's response (e.g., "papa means dad") to the inquiry.

In one embodiment, the electronic device may obtain an image through the camera and receive the tag "my dad Chulsoo" through the sensor from the user. The electronic device may recognize two figures, i.e., an unknown figure and the dad registered in the second database based on the second database. The electronic device may detect the first context information "daytime" through the sensor or camera and the second context information "home" through the communication module. The electronic device may perceive the unknown figure as the "mom" based on the detected first and second context information and the first database and register the identification information "mom" and the image or the mom's portion in the image in the second database. The first database may include information (or values) or data model indicating the relevancy among common information/data elements in the plurality of metadata for the plurality of images stored in the third database. For example, the first database may include such information as, e.g., the number of times, frequency, or percentage at which the mom showed up in images captured at home during the daytime or the probability or accuracy of estimation of the figure in the images captured at home during the nighttime as the mom. The electronic device may change the tag "my dad Chulsoo, married couple photo" into the tag "my dad Chulsoo, my mom, married couple photo" or "my dad Chulsoo, my mom, married couple photo captured at home during daytime" and may store in the third database (e.g., the image/metadata database 412) or the tag "my dad Chulsoo, my mom, married couple photo" or "my dad Chulsoo, my mom, married couple photo captured at home during daytime" as separate image description information, in the third database.

FIGS. 7A, 7B, 7C, and 7D are views illustrating a metadata modeling method on an electronic device according to various embodiments.

The metadata modeling method of the electronic device may be performed by at least one of the electronic device (e.g., the electronic device 101, 201, or 401) or a controller or processor (e.g., the processor 120, 210, or 410) of the electronic device.

Figure 7A:
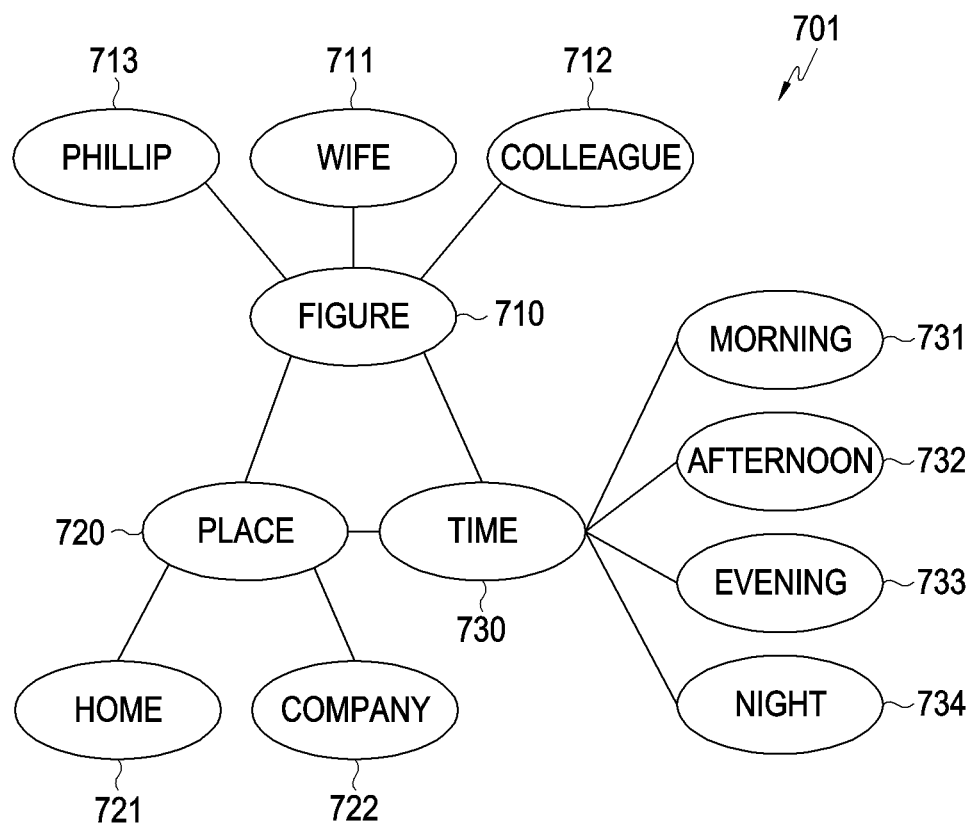

FIG. 7A illustrates a data structure 701 of a first database (e.g., at least one of the ontology database 411 or the metadata model database 413) stored in the electronic device (or the memory 130, 230, or 430). The first database may include a plurality of categories (or topics/classes) 710, 720, and 730 and information (or data) elements 711, 712, 713, 721, 722, 731, 732, 733, and 734 belonging to each category 710, 720, and 730.

For example, the figure category 710 may include wife 711, colleague 712, and Philip 713. The place category 720 may include home 721 and company 722. The time category 730 may include morning 731, afternoon 732, evening 733, and night 734.

Referring to FIGS. 7B and 7C, the electronic device may yield information (or values) indicating the relevancy among the information (or data) elements 711, 712, 713, 721, 722, 731, 732, 733, and 734 of the first database among the plurality of metadata for the plurality of images stored in the third database (e.g., the image/metadata database 412). For example, the electronic device may calculate the number of images related to all of three information elements. Referring to a first metadata model 702 shown in FIG. 7B, it may be shown that the number of images related to morning 731, colleague 712, and company 722 is 21. Referring to a second metadata model 702 shown in FIG. 7C, it may be shown that the number of images related to evening 733, home 721, and wife 711 is 67.

In one embodiment, the electronic device may determine the accuracy of estimation of any one of morning 731, colleague 712, and company 722 or any one of evening 733, home 721, and wife 711 considering, e.g., the ratio of the calculated number of images to the total number of the images.

Figure 7D:
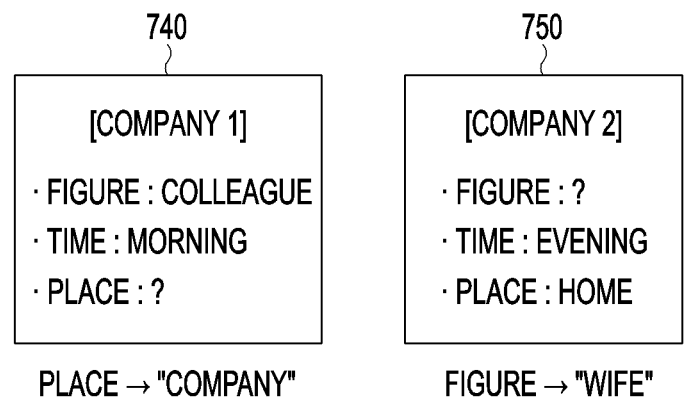

Referring to FIG. 7D, it can be shown that the metadata 740 of a first photo stored in the third database includes colleague 712 in the figure category 710 and morning 731 in the time category 730 but not the information elements in the place category 720. For example, the electronic device may estimate the information element of the place category 720 as company 722 based on the first metadata model 702.

It can be shown that the metadata 750 of a second photo stored in the third database includes evening 733 in the time category 730 and home 721 in the place category 720 but not the information elements in the figure category 710. For example, the electronic device may estimate the information element of the figure category 710 as wife 711 based on the second metadata model 703.

In one embodiment, upon being unable to obtain the metadata (or information/data element) of a particular category for an image, the electronic device may estimate the metadata of the particular category for the image using the metadata (or information/data elements) of the particular category for other images gathered by the electronic device. Or, upon failing to obtain the metadata (or information/data element) of a particular category for an image, the electronic device may estimate the metadata of the particular category for the image using a metadata model (e.g., the metadata model 702 or 703) or a metadata model database (e.g., the metadata model database 413).

In one embodiment, the electronic device may modify the recognition information about the image based on the first database. For example, the electronic device may perceive the figure in the image as the wife based on the second database (the target database 414) and determine that the accuracy is 50%. For example, upon estimating the figure in the image as the wife based on the first database, the electronic device may increase the accuracy. For example, upon estimating the figure in the image as the colleague based on the first database, the electronic device may reduce the accuracy or make a modification so that the figure in the image is the colleague.

Figure 8:
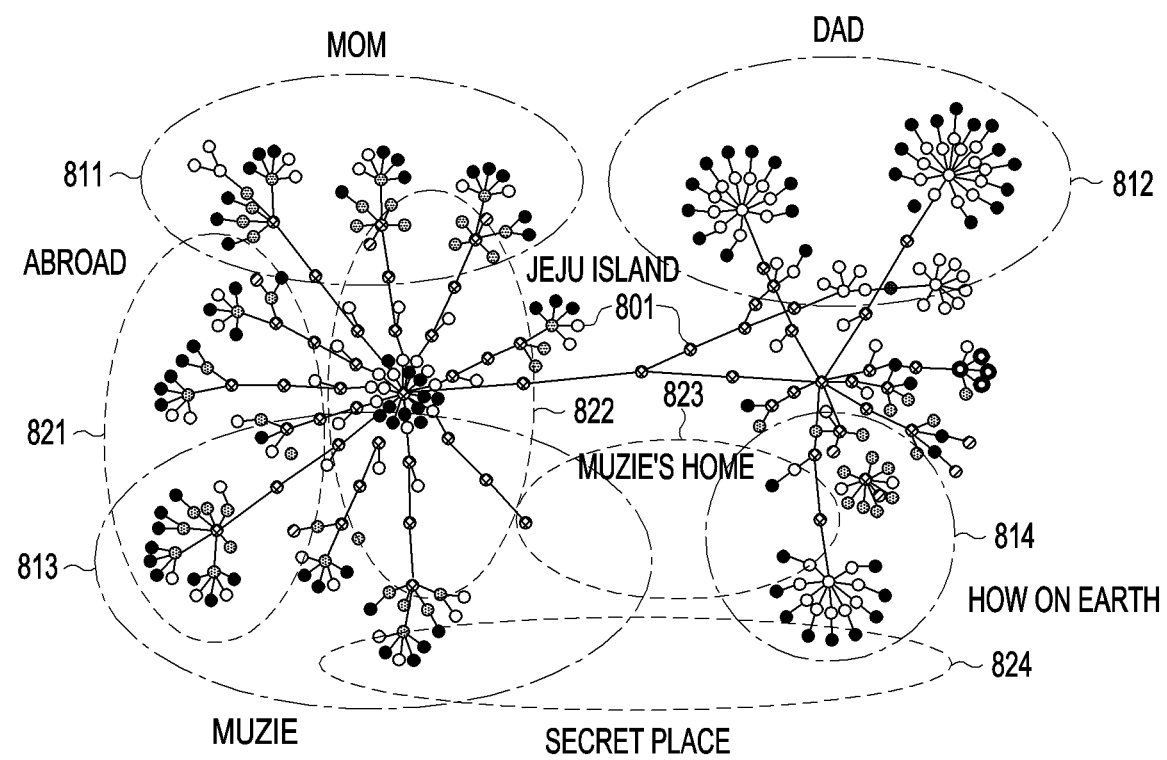
FIG. 8 is a view illustrating an image classifying method on an electronic device according to various embodiments.

FIG. 8 is a view illustrating an image classifying method on an electronic device according to various embodiments.

The image classifying method of the electronic device may be performed by at least one of the electronic device (e.g., the electronic device 101, 201, or 401) or a controller or processor (e.g., the processor 120, 210, or 410) of the electronic device.

The electronic device may link and diagram the plurality of images 801 stored in the third database (e.g., the image/metadata database 412) according to the corresponding metadata.

The electronic device may classify the plurality of images stored in the third database based on the data structure (e.g., the data structure 701) of the first database (e.g., at least one of the ontology database 411 or the metadata model database 413) stored in the electronic device (or memory 130, 230, or 430). The electronic device may classify the plurality of images according to the categories/topics/classes (e.g., the categories 710, 720, and 730) of the first database. For example, the electronic device may classify the plurality of images into figure categories 811 to 814 (e.g., the figure category 710) and place categories 821 to 824 (e.g., the place category 720). Further, the electronic device may set the information/data elements (e.g., information/data elements 711, 712, 713, 721, 722, 731, 732, 733, and 734) of the first database as sub categories and classify the plurality of images in each category according to the sub categories. For example, the electronic device may classify the images of the figure categories 811 to 814 into a mom category 811, a dad category 812, a Muzie category 813, and a how-on-earth category 814. For example, the electronic device may classify the images of the place categories 821 to 824 into an abroad category 821, a Jeju Island category 822, a Muzie's home category 823, and a secret place category 824.

Figure 9:
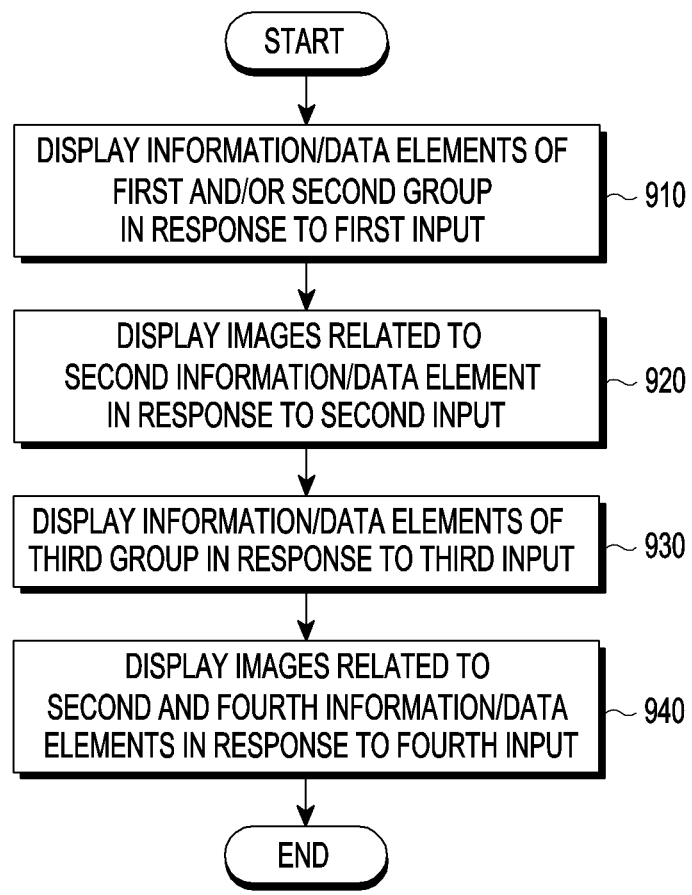
FIG. 9 is a flowchart illustrating image search method on an electronic device according to various embodiments.

FIG. 9 is a flowchart illustrating image search method on an electronic device according to various embodiments. The image search method of the electronic device may include operations 910 to 940. The image search method of the electronic device may be performed by at least one of the electronic device (e.g., the electronic device 101, 201, or 401) or a controller or processor (e.g., the processor 120, 210, or 410) of the electronic device.

In operation 910, in response to a first input, the electronic device may display, on a display (e.g., the display 160, 260, or 460) functionally connected with the electronic device, information/data elements of a first and/or second group among the plurality of information/data elements in the first database (e.g., at least one of the ontology database 411 or the metadata model database 413) stored in the electronic device (or memory 130, 230, or 430).

In one embodiment, in response to the first input, the electronic device may display the information/data elements of the first group on a first area (or first screen area or first window) of the display. The plurality of information/data elements may be related to a plurality of metadata for the plurality of images stored in the electronic device (or the memory 130, 230, or 430) or the third database (e.g., the image/metadata database 412).

For example, the first input may be received through an input device (e.g., at least one of the input device 250, the display 160, 260, or 460, the microphone 288, the sensor module 240, or the sensor 440) of the electronic device.

For example, the first input may be a touch input for selecting an icon displayed on the display.

In one embodiment, the electronic device may display the information/data elements of the first group on a first graphical element that, as rotated, allows any one thereof to be selectable.

In one embodiment, the electronic device may display, on a second area (or second screen area or second window) of the display, the information/data elements of the second group among the plurality of information/data elements related to the first information/data element among the information/data elements of the first group. For example, the first graphical element may be overlaid on the second area transparently/semi-transparently/opaquely.

For example, in response to a user input of rotating the first graphical element, the electronic device may display, on the second area, the information/data elements of the corresponding group related to the information/data element selected as per the rotation among the information/data elements of the first group.

In operation 920, in response to a second input, the electronic device may display, on the second area (or a third area), images related to the second information/data element among the information/data elements of the second group. For example, the second input may be a touch input of selecting the second information/data element.

In operation 930, in response to a third input, the electronic device may display, on the first area, information/data elements of the third group among the plurality of information/data elements related to the second information/data element.

For example, the third input may be a swipe gesture of a preset pattern (e.g., L-shaped or C-shaped) on the second area (or third area).

In one embodiment, the electronic device may display the information/data elements of the third group on a second graphical element that, as rotated, allows any one thereof to be selectable.

In one embodiment, the electronic device may display, on the second area of the display, the information/data elements of a fourth group among the plurality of information/data elements related to the third information/data element among the information/data elements of the third group.

For example, the second graphical element may be overlaid on the second area transparently/semi-transparently/opaquely.

For example, in response to a user input of rotating the second graphical element, the electronic device may display, on the second area, the information/data elements of the corresponding group related to the information/data element selected as per the rotation among the information/data elements of the third group.

In operation 940, in response to a fourth input, the electronic device may display, on the second area (or the third area), images related to the second information/data element and the fourth information/data element among the information/data elements of the fourth group. For example, the fourth input may be a touch input of selecting the fourth information/data element.

FIGS. 10A, 10B, 10C, and 10D are views illustrating an image search method on an electronic device according to various embodiments. The image search method of the electronic device may be performed by at least one of the electronic device (e.g., the electronic device 101, 201, or 401) or a controller or processor (e.g., the processor 120, 210, or 410) of the electronic device.

Figure 10A:
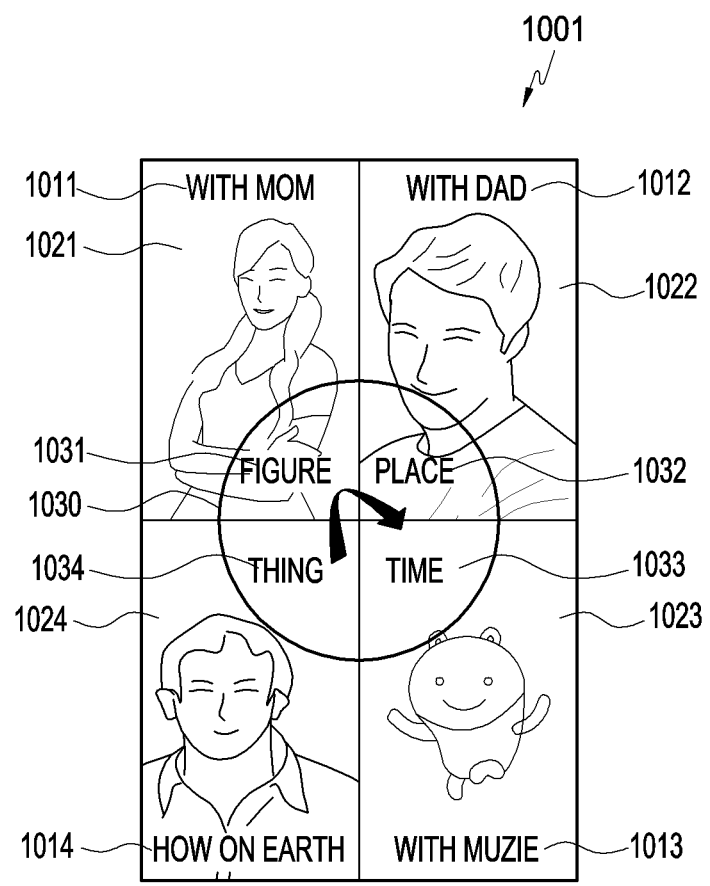
FIGS. 10A, 10B, 10C, and 10D are views illustrating an image search method on an electronic device according to various embodiments.

Referring to FIG. 10A, in response to a first input, the electronic device may display, on a display (e.g., the display 160, 260, or 460) functionally connected with the electronic device, information/data elements 1031 to 1034 of a first group (e.g., categories/topics/classes) and information/data elements 1011 to 1014 of a second group (e.g., the figure categories 710 and 811 to 814 among the plurality of information/data elements in the first database (e.g., at least one of the ontology database 411 or the metadata model database 413) stored in the electronic device (or memory 130, 230, or 430).

In response to the first input, the electronic device may display the information/data elements 1031 to 1034 of the first group on a first area (or first screen area or first window) of the display. The plurality of information/data elements may be related to a plurality of metadata for the plurality of images stored in the electronic device (or the memory 130, 230, or 430) or the third database (e.g., the image/metadata database 412).

For example, the information/data elements 1031 to 1034 of the first group may include FIG. 1031, place 1032, time 1033, and thing 1034, and the information/data elements 1011 to 1014 of the second group may include with mom 1011, with dad 1012, with Muzie 1013, and how on earth 1014.

For example, the first input may be received through an input device (e.g., at least one of the input device 250, the display 160, 260, or 460, the microphone 288, the sensor module 240, or the sensor 440) of the electronic device. For example, the first input may be a touch input for selecting an icon displayed on the display.

The electronic device may display the information/data elements 1031 to 1034 of the first group on a first graphical element that, as rotated, allows any one thereof to automatically be selected.

The electronic device may display the information/data elements 1011 to 1014 of the second group related to the FIG. 1031 among the information/data elements 1031 to 1034 of the first group on a second area 1001 (or second screen area or second window) of the display. For example, the second area 1001 may correspond to the overall display area of the display. For example, the first graphical element 1030 may be overlaid on the second area 1001 transparently/semi-transparently/opaquely.

For example, in response to a user input of rotating the first graphical element 1030, the electronic device may display, on the second area 1001, the information/data elements of the corresponding group related to the information/data element selected as per the rotation among the information/data elements of the first group.

The electronic device may display representative images 1021, 1022, 1023, and 1024 respectively associated with the information/data elements 1011 to 1014 of the second group, along with the information/data elements 1011 to 1014 of the second group. For example, the electronic device may display the corresponding representative images 1021, 1022, 1023, and 1024 most relevant to the information/data elements 1011 to 1014, respectively, of the second group, along with the information/data elements 1011 to 1014, respectively.

In one embodiment, the electronic device may sequentially or automatically display the images related with the information/data elements 1011 to 1014, respectively, of the second group.

Figure 10B:
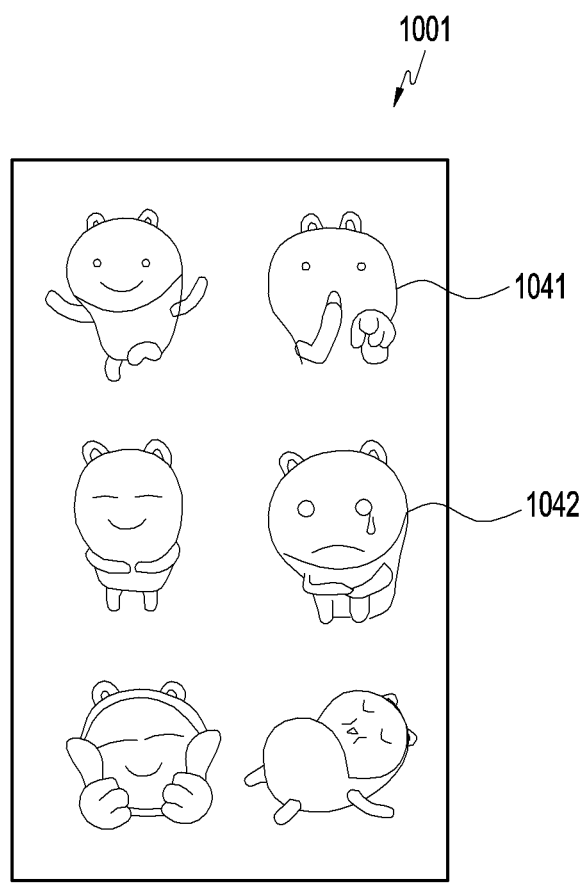

Referring to FIG. 10B, in response to a second input, the electronic device may display, on the second area 1001, images 1041 and 1042 related to the second information/data element 1013 among the information/data elements 1011 to 1014 of the second group. For example, in response to a second input, the electronic device may display, on the second area 1001, images 1041 and 1042 having the metadata containing the second information/data element 1013 among the plurality of images. For example, the electronic device may first display images with a high accuracy of matching with the second information/data element 1013 among the images 1041 and 1042 having the metadata containing the second information/data element 1013.

For example, the second input may be a touch input of selecting the second information/data element 1013.

Figure 10C:
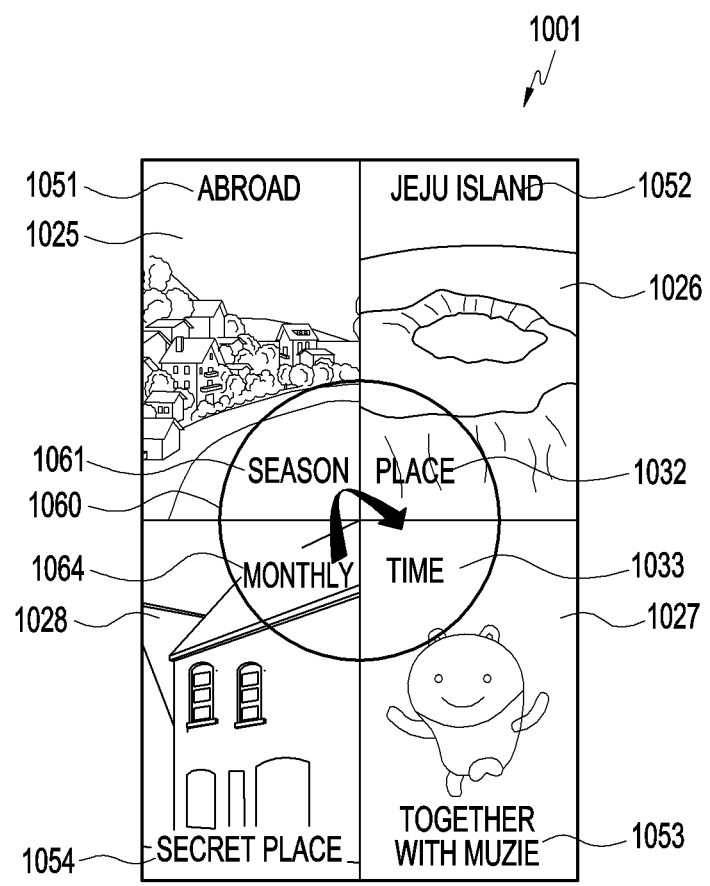

Referring to FIG. 10C, in response to a third input, the electronic device may display, on the display, information/data elements 1051 to 1054 of a fourth group (e.g., the place categories 720 and 821 to 824) and the information/data elements 1032, 1033, 1061, and 1064 of the third group (e.g., the categories/topics/classes 710, 720, and 730) among the plurality of information/data elements related to the second information/data element 1013.

The electronic device may display the information/data elements 1032, 1033, 1061, and 1064 of the third group on the first area in response to the third input.

For example, the information/data elements 1032, 1033, 1061, and 1064 of the third group may include season 1061, place 1032, time 1033, and monthly 1064, and the information/data elements 1051 to 1054 of the fourth group may include abroad 1051, Jeju Island 1052, Muzie's home 1053, and secret place 1054.

For example, the third input may be a swipe gesture of a preset pattern (e.g., L-shaped or C-shaped) on the second area 1001.

In one embodiment, the electronic device may display the information/data elements 1032, 1033, 1061, and 1064 of the third group on a second graphical element that, as rotated, allows any one thereof to be selected.

In one embodiment, the electronic device may display, on the second area 1001, the information/data elements 1051 to 1054 of the fourth group related to the third information/data element 1032 among the information/data elements 1032, 1033, 1061, and 1064 of the third group.

For example, the second graphical element 1060 may be overlaid on the second area 1001 transparently/semi-transparently/opaquely.

For example, in response to a user input of rotating the second graphical element 1060, the electronic device may display, on the second area 1001, the information/data elements of the corresponding group related to the information/data element selected as per the rotation among the information/data elements 1032, 1033, 1061, and 1064 of the third group.

The electronic device may display representative images 1025, 1026, 1027, and 1028 respectively associated with the information/data elements 1051 to 1054 of the fourth group, along with the information/data elements 1051 to 1054 of the fourth group. For example, the electronic device may display the corresponding representative images 1025, 1026, 1027, and 1028 most relevant to the information/data elements 1051 to 1054, respectively, of the fourth group, along with the information/data elements 1051 to 1054, respectively.

In one embodiment, the electronic device may sequentially or automatically display the images related with the information/data elements 1051 to 1054, respectively, of the fourth group.

Figure 10D:
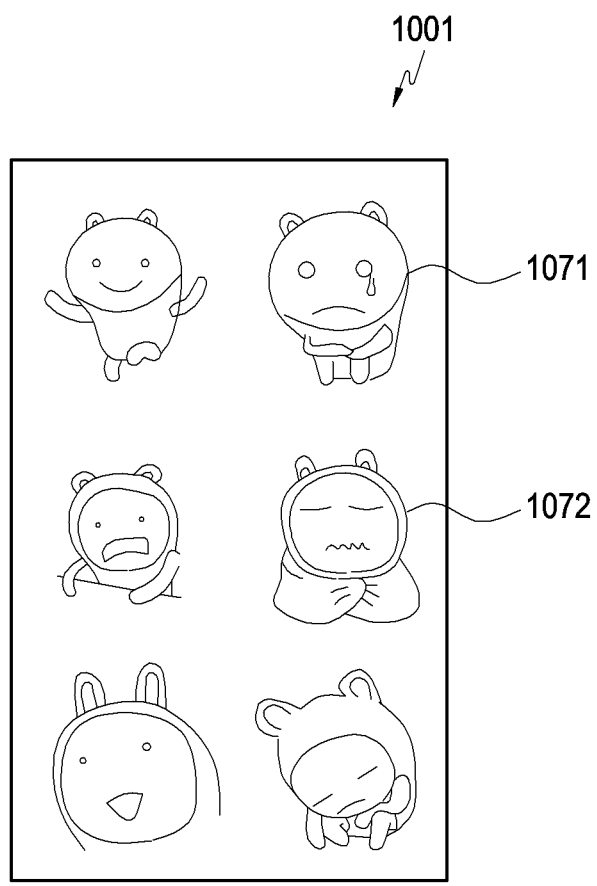

Referring to FIG. 10D, in response to a fourth input, the electronic device may display, on the second area 1001, images 1071 and 1072 related to the second information/data element 1053 (and the second information/data element 1013) among the information/data elements 1051 to 1054 of the fourth group. For example, the fourth input may be a touch input of selecting the fourth information/data element 1053. For example, the electronic device may first display images with a high accuracy of matching with the second information/data element 1013 and the fourth information/data element 1053 among the images 1071 and 1072 having the metadata containing the second information/data element 1013 and the fourth information/data element 1053.

Figure 11:
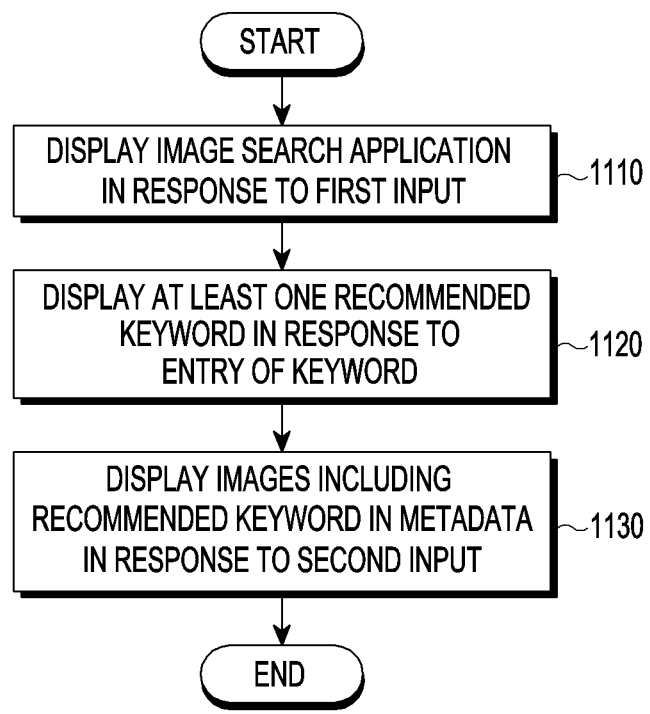
FIG. 11 is a flowchart illustrating image search method on an electronic device according to various embodiments.

FIG. 11 is a flowchart illustrating image search method on an electronic device according to various embodiments. The image search method of the electronic device may include operations 1110 to 1130. The image search method of the electronic device may be performed by at least one of the electronic device (e.g., the electronic device 101, 201, or 401) or a controller or processor (e.g., the processor 120, 210, or 410) of the electronic device.

In operation 1110, in response to a first input, the electronic device may display an image search application (or application screen/GUI) on a display (e.g., the display 160, 260, or 460) functionally connected with the electronic device.

For example, the first input may be received through an input device (e.g., at least one of the input device 250, the display 160, 260, or 460, the microphone 288, the sensor module 240, or the sensor 440) of the electronic device.

For example, the first input may be a touch input for selecting an icon displayed on the display.

In one embodiment, operation 1110 may be omitted. For example, the electronic device may detect a user input on a home screen, voice recognition screen, or search screen.

In operation 1120, in response to entry of a keyword, the electronic device may produce at least one recommended keyword by integrating the keyword with each of at least one information/data element in the first database (e.g., at least one of the ontology database 411 or the metadata model database 413) stored in the electronic device (or memory 130, 230, or 430). The electronic device may display the keyword and the at least one recommended keyword together on the display.

In operation 1130, in response to a second input, the electronic device may display, on the display, images in which one selected from among the at least one recommended keyword is contained in the metadata among the images stored in the electronic device (or memory 130, 230, or 430). For example, the second input may be a touch input of selecting one of the at least one recommended keyword.

Figure 12A:
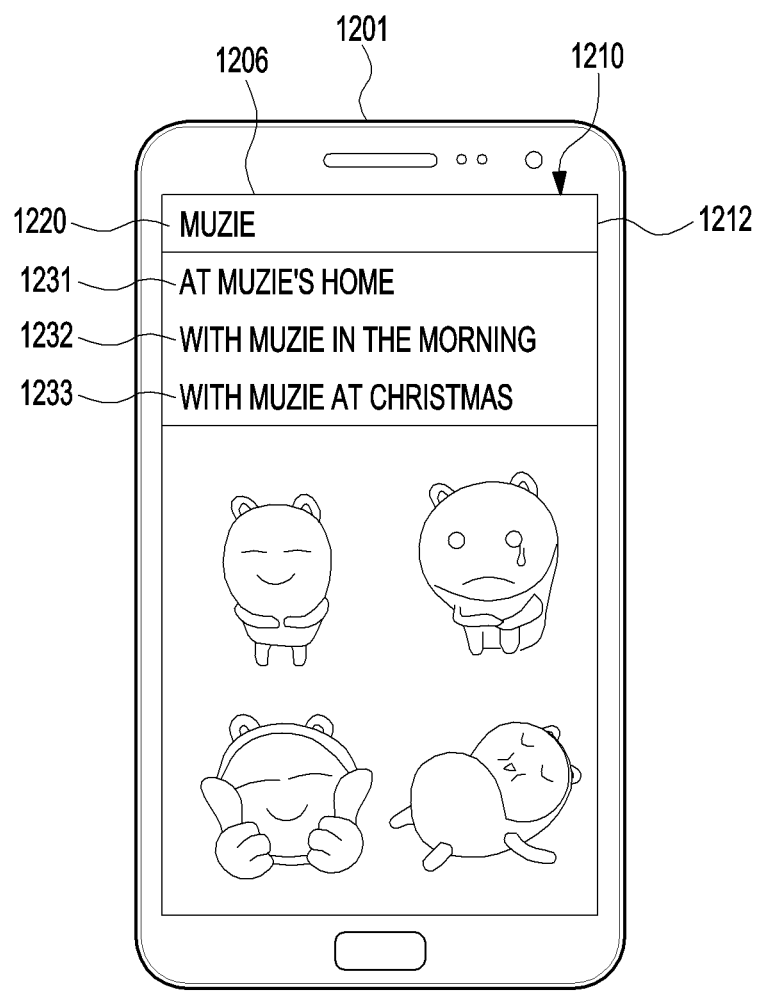
FIGS. 12A and 12B are views illustrating an image search method on an electronic device according to various embodiments.
Figure 12B:
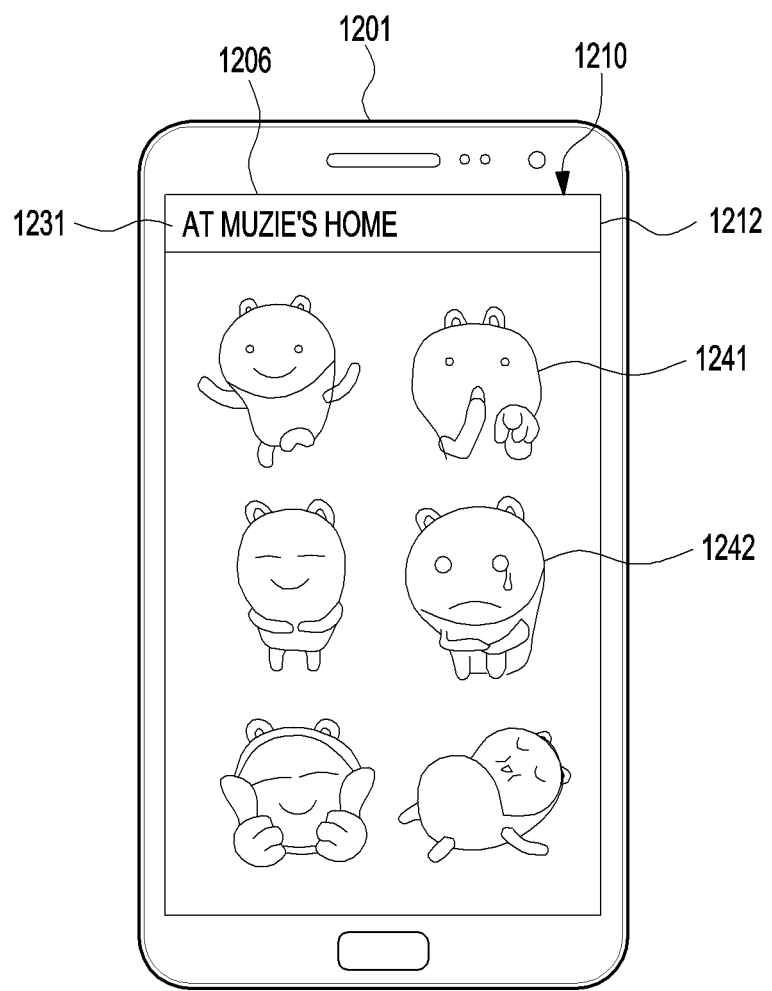

FIGS. 12A and 12B are views illustrating an image search method on an electronic device according to various embodiments. The image search method of the electronic device 1201 may be performed by at least one of the electronic device 1201 (e.g., the electronic device 101, 201, or 401) or a controller or processor (e.g., the processor 120, 210, or 410) of the electronic device 1201.

Referring to FIG. 12A, in response to a first input, the electronic device 1201 may display an image search application 1210 (or application screen/GUI) on a display 1206 (e.g., the display 160, 260, or 460) functionally connected with the electronic device 1201. For example, the first input may be received through an input device (e.g., at least one of the input device 250, the display 160, 260, or 460, the microphone 288, the sensor module 240, or the sensor 440) of the electronic device 1201. For example, the first input may be a touch input for selecting an icon displayed on the display 1206.

The image search application 1210 may include a search window for receiving keywords from the user.

For example, the electronic device 1201 may receive a keyword 1220 (e.g., Muzie) from the user through the search window 1212.

In response to entry of the keyword 1220, the electronic device 1201 may produce at least one recommended keyword 1231, 1232, and 1233 by integrating the keyword 1220 with each of at least one information/data element (e.g., Muzie's home, morning, or Christmas) in the first database (e.g., at least one of the ontology database 411 or the metadata model database 413) stored in the electronic device 1201 (or memory 130, 230, or 430). For example, the at least one recommended keyword 1231, 1232, and 1233 may include at Muzie's home 1231, with Muzie in the morning 1232, and with Muzie at Christmas 1233. The electronic device 1201 may display the keyword 1220 along with the at least one recommended keyword 1231, 1232, and 1233 on the display 1206.

Referring to FIG. 12B, in response to a second input, the electronic device 1201 may display, on the display 1206, images 1241 and 1242 in which one (e.g., Muzie's home) selected from among the at least one recommended keyword 1231, 1232, and 1233 is contained in the metadata among the images stored in the electronic device 1201 (or memory 130, 230, or 430). For example, the second input may be a touch input of selecting one of the at least one recommended keyword 1231, 1232, and 1233. For example, the electronic device 1201 may first display images with a high accuracy of matching with one (e.g., Muzie's home) selected from among the at least one recommended keyword 1231, 1232, and 1233 among the images 1241 and 1242 having the metadata containing one (e.g., Muzie's home) selected from among the at least one recommended keyword 1231, 1232, and 1233.

Figure 13:
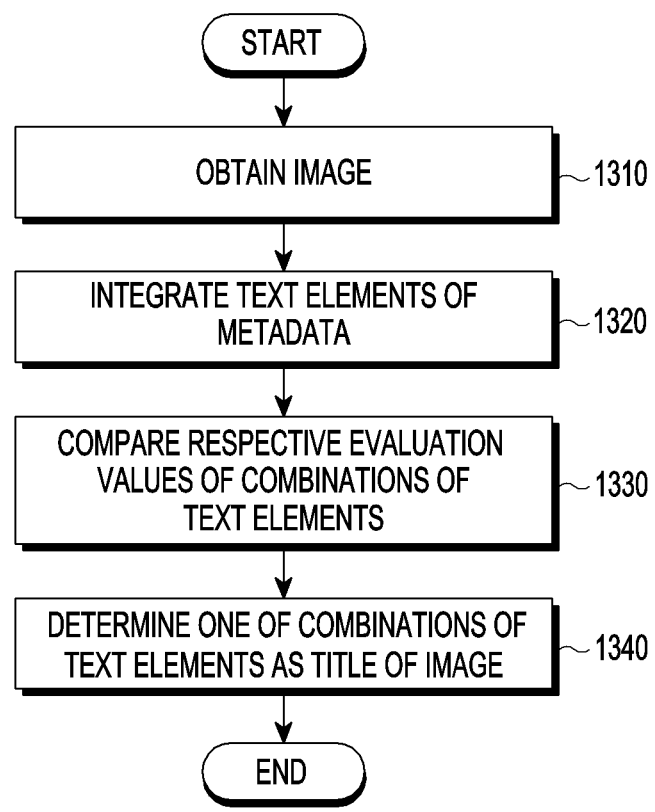
FIG. 13 is a flowchart illustrating an image title determining method on an electronic device according to various embodiments.

FIG. 13 is a flowchart illustrating an image title determining method on an electronic device according to various embodiments. The image title determining method of the electronic device may include operations 1310 to 1340. The image title determining method of the electronic device may be performed by at least one of the electronic device (e.g., the electronic device 101, 201, or 401) or a controller or processor (e.g., the processor 120, 210, or 410) of the electronic device.

In operation 1310, the electronic device may obtain images.

In one embodiment, the electronic device may obtain an image for an object using a camera (e.g., the camera module 291 or camera 490) functionally connected with the electronic device.

In one embodiment, when/while the image is captured, the electronic device may display, in real-time, the image on a display (e.g., the display 160, 260, or 460) functionally connected with the electronic device or a first area (or a first screen area or first window) of the display.

In one embodiment, the capture of the image may be initiated by receiving a capture command from the user or automatically according to the setting information stored in a memory (e.g., the memory 130, 230, or 430) functionally connected with the electronic device.

In one embodiment, the end of the image capture may be performed by receiving a capture end command from the user or automatically according to the setting information stored in the memory. For example, the electronic device may recommend the capture command and/or the capture end command through an input device (e.g., at least one of the input device 250, the display 160, 260, or 460, the microphone 288, the sensor module 240, or the sensor 440).

In one embodiment, the electronic device may read the image from the memory functionally connected with the electronic device.

In one embodiment, the electronic device may receive the image from an external device (e.g., the electronic device 102 or 104 or the server 106) through a communication module (e.g., the communication module 170, 220, or 420) functionally connected with the electronic device.

In operation 1320, the electronic device may integrate the text elements of the metadata for the image stored in the memory or third database (e.g., the image/metadata database 412).

In one embodiment, the electronic device may incorporate the text elements of the metadata for the image based on a first database (e.g., at least one of the ontology database 411 or the metadata model database 413) defining a plurality of information/data elements and relations among the plurality of information/data elements.

For example, the first database may include the relations among the text elements and weights for the relations. For example, the weights may be determined by, e.g., the number of times, frequency, and percentage at which combinations of the text elements show up in the plurality of metadata stored in the memory or the third database.

In operation 1330, the electronic device may compare the respective evaluation values for the combinations of the text elements. For example, the evaluation value of each combination may be determined as the sum of the relation weight(s) of the text elements included in each combination.

In operation 1340, the electronic device may determine one of the combinations of the text elements as the title of the image based on the comparison. The electronic device may include the determined title in the metadata of the image.

Figures 14A, 14B:
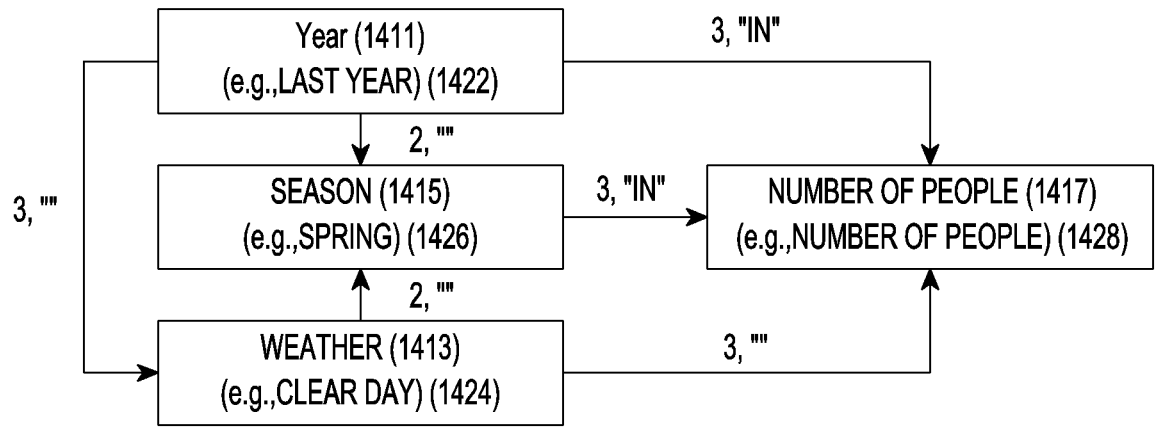
FIGS. 14A and 14B are views illustrating an image title determining method on an electronic device according to various embodiments.

FIGS. 14A and 14B are views illustrating an image title determining method on an electronic device according to various embodiments. The image title determining method of the electronic device may be performed by at least one of the electronic device (e.g., the electronic device 101, 201, or 401) or a controller or processor (e.g., the processor 120, 210, or 410) of the electronic device.

Referring to FIG. 14A, the electronic device may integrate text elements 1422 to 1428 of the metadata for the image stored in a memory (e.g., the memory 130, 230, or 430) or the third database (e.g., the image/metadata database 412) functionally connected with the electronic device based on the first database (e.g., at least one of the ontology database 411 or the metadata model database 413) defining a plurality of information/data elements 1411 to 1428 and the relation among the plurality of information/data elements 1411 to 1428.

For example, the first database may include a plurality of categories/topics/classes 1411 to 1417 and the information/ data elements 1422 to 1428 belonging to the categories/ topics/classes 1411 to 1417, respectively. Further, the first database may include the relations among the plurality of categories/topics/classes 1411 to 1417 and weights for the relations. For example, the plurality of categories/topics/ classes 1411 to 1417 may include year 1411, weather 1413, season 1415, and number of people 1417, and the information/data elements 1422 to 1428 may include last year 1422, clear day 1424, spring 1426, and alone 1428 (or a photo taken alone). For example, the relation between year 1411 and weather 1413, the relation between year 1411 and number of people 1417, the relation between weather 1413 and number of people 1417, and the relation between season 1415 and number of people 1417 each may be assigned a weight of 3, and the relation between year 1411 and weather 1415 and the relation between weather 1413 and season 1415 each may be assigned a weight of 2.

Referring to FIG. 14B, the electronic device may compare the respective evaluation values for the combinations 1432 to 1438 of the text elements 1422 to 1428. For example, the evaluation value of each combination 1432 to 1438 may be determined as the sum of the relation weight(s) of the text elements 1422 to 1428 included in each combination. For example, the evaluation value for a photo 1432 taken alone last year may be 3, the evaluation value for a photo 1434 taken alone in the last spring may be 5, the evaluation value for a photo 1436 taken alone on a clear day last year may be 6, and the evaluation value for a photo 1438 taken alone on a clear day in the last spring may be 8.

The electronic device may determine one of the combinations 1432 to 1438 of the text elements 1422 to 1428 as the title of the image based on the comparison. For example, the electronic device may determine that among the combinations 1432 to 1438, the one with the highest evaluation value, i.e., the photo 1438 taken alone on a clear day last year, is the title of the image.

The electronic device may include the determined title in the metadata of the image.

In one embodiment, the electronic device may display the combinations 1432 to 1438 (and the image) on a display (e.g., the display 160, 260, or 460) functionally connected with the electronic device and may determine the selected combination as the title of the image according to a user input of selecting one of the combinations 1432 to 1438.

Figure 15A:
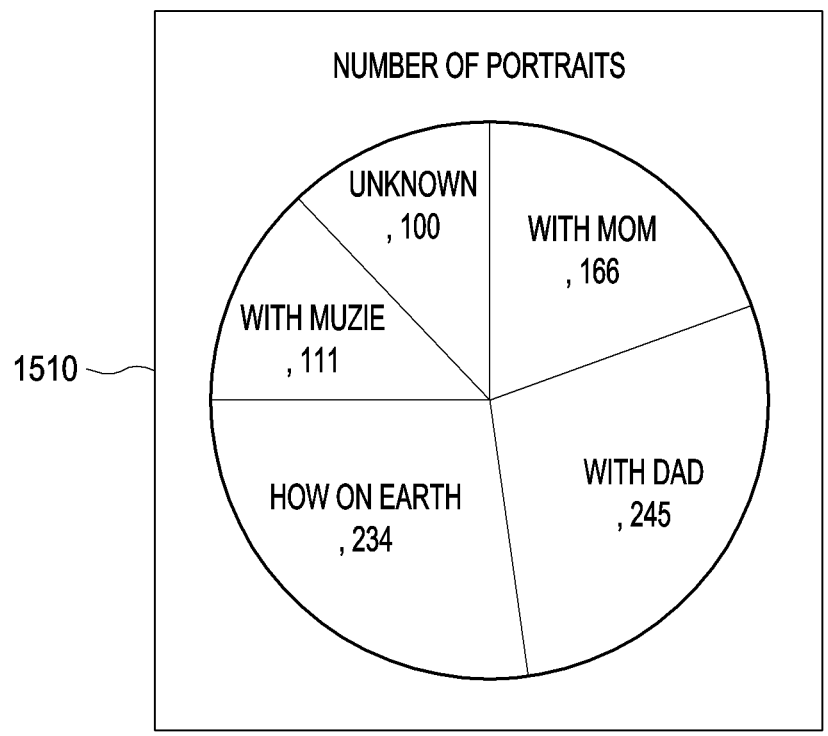
FIGS. 15A, 15B, and 15C are views illustrating a statistical information providing method on an electronic device according to various embodiments.
Figure 15B:
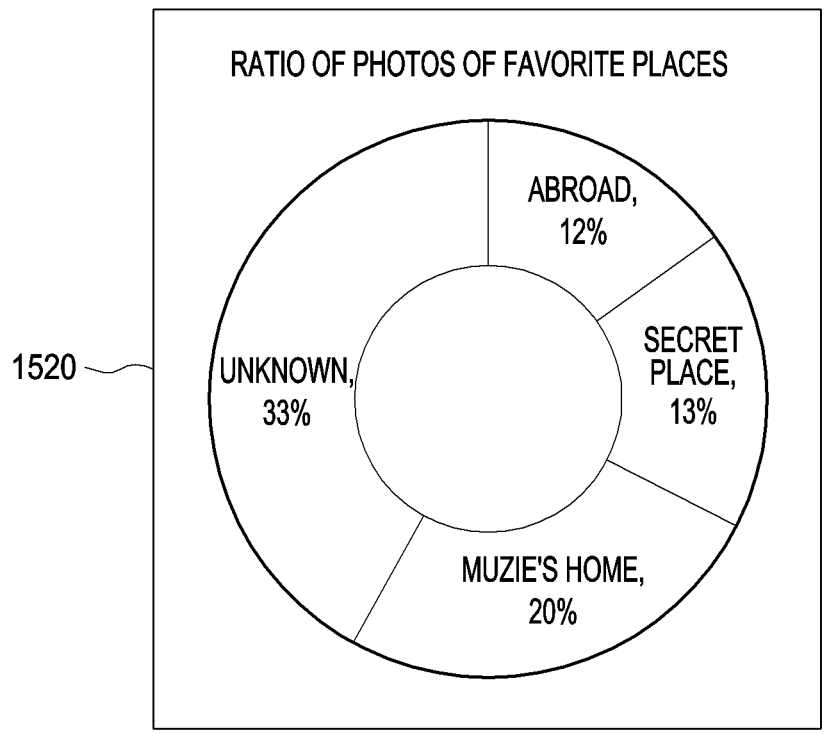
Figure 15C:
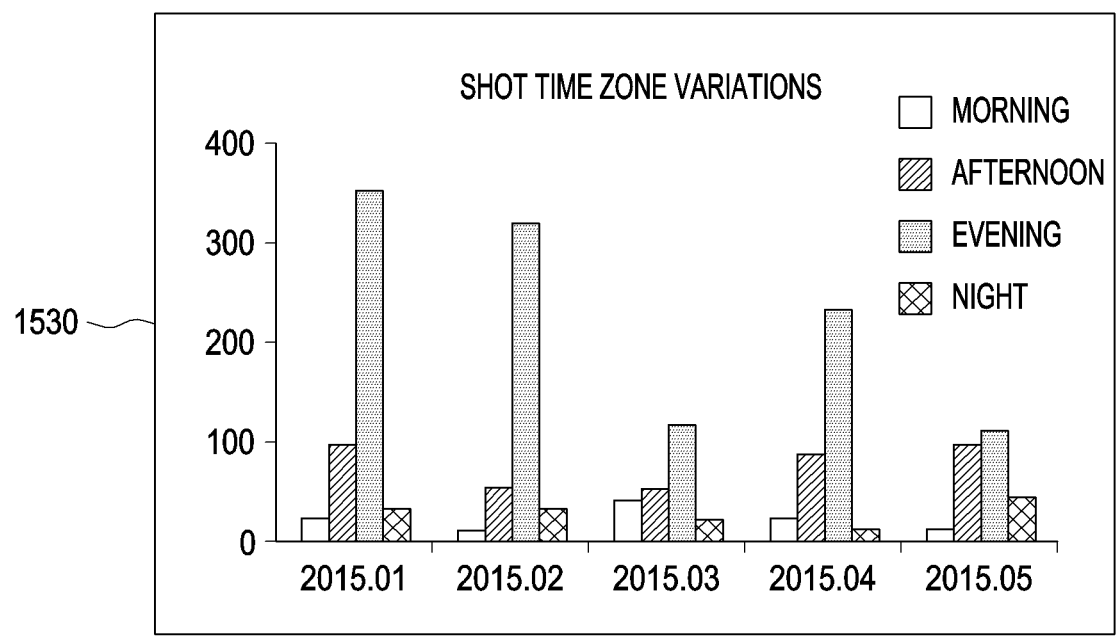

FIGS. 15A, 15B, and 15C are views illustrating a statistical information providing method on an electronic device according to various embodiments. The statistical information providing method of the electronic device may be performed by at least one of the electronic device (e.g., the electronic device 101, 201, or 401) or a controller or processor (e.g., the processor 120, 210, or 410) of the electronic device.

Referring to FIG. 15A, the electronic device may yield statistical information 1510 about the number of portraits for a plurality of metadata stored in the third database (e.g., the image/metadata database 412) or a memory (e.g., the memory 130, 230, or 430) functionally connected with the electronic device and display the statistical information 1510 on a display (e.g., the display 160, 260, or 460) functionally connected with the electronic device.

The electronic device may produce and display count statistical information 1510 about photos including, as metadata, information/data elements (e.g., with mom 1011, with dad, with Muzie 1013, and how on earth 1014) of the first database (e.g., at least one of the ontology database 411 or metadata model database 413) stored in the electronic device (or memory 130, 230, or 430).

Referring to FIG. 15B, the electronic device may produce statistical information 1520 about a ratio of photos in a preferred place for the plurality of metadata and display the produced statistical information 1520 on the display.

The electronic device may produce and display ratio statistical information 1520 about photos including, as metadata, information/data elements (e.g., at least one of abroad 1051, Jeju Island 1052, Muzie's home 1053, and secret place 1054) of the first database.

Referring to FIG. 15C, the electronic device may produce monthly variation statistical information 1530 about capturing time zones for the plurality of metadata and display the produced statistical information 1530 on the display.

The electronic device may produce and display monthly time zone variation statistical information 1530 about photos including, as metadata, information/data elements (e.g., at least one of morning 731, afternoon 732, evening 733, and night 734) of the first database.

Figure 16:
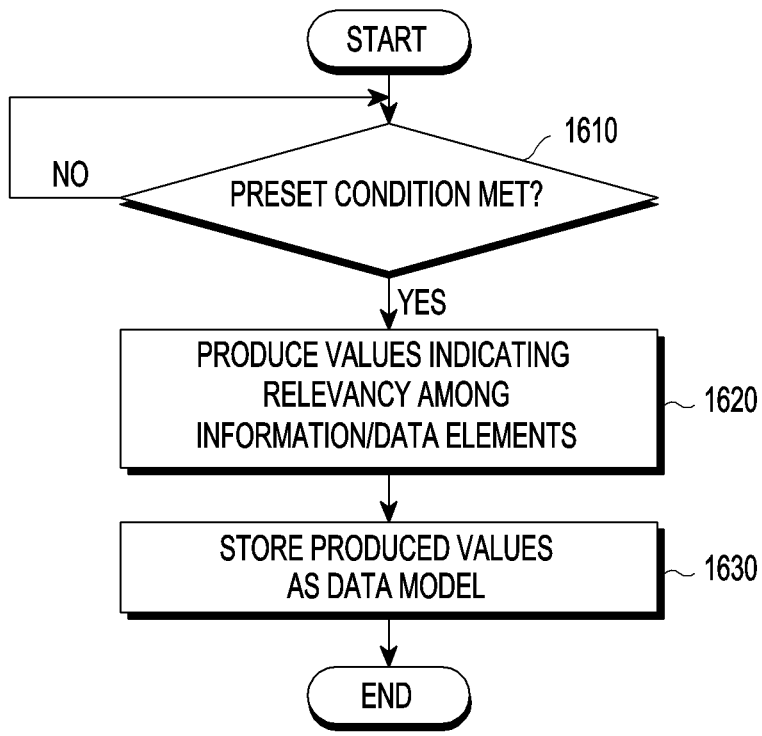
FIG. 16 is a flowchart illustrating a metadata model producing method on an electronic device according to various embodiments.

FIG. 16 is a flowchart illustrating a metadata model producing method on an electronic device according to various embodiments. The metadata model producing method of the electronic device may include operations 1610 to 1630. The metadata model producing method of the electronic device may be performed by at least one of the electronic device (e.g., the electronic device 101, 201, or 401) or a controller or processor (e.g., the processor 120, 210, or 410) of the electronic device.

In operation 1610, the electronic device may determine whether preset conditions are met. The electronic device may perform operation 1620 upon meeting the preset conditions, or otherwise upon failing to meet the preset conditions, periodically/aperiodically repeat operation 1610.

For example, the preset conditions may include at least one of arrival of a preset period, the usage of computing resources of the electronic device being not more than a preset threshold, the remaining battery life of the electronic device being not less than a preset threshold, the passage of a preset time from the last time that a metadata model was produced, the number of new images obtained being not less than a preset threshold, providing a service or function using metadata, receiving a user input, the electronic device booting up, a transition from a sleep mode of the electronic device to a normal mode, the display screen/power-on after entry into the sleep mode of the electronic device, executing an application including a graphical element (or item) (e.g., at least one of a button, icon, menu, or menu item) requiring a metadata model, displaying a screen including a graphical element requiring a metadata model, the user's approach to a graphical element requiring a metadata model, detecting a context associated with the electronic device that matches a preset context, or detecting at least one word matching at least one preset word.

In one embodiment, the preset context for the electronic device may include at least one of the electronic device being positioned or reaching a preset area/place, reaching a preset time, the electronic device operating as per a preset operation pattern (e.g., executing an application(s)), or the current status (e.g., at least one of the battery status, wireless signal reception status, or memory status) of the electronic device matching a preset status.

In one embodiment, the preset context for the electronic device may be determined based on the use history information (e.g., the history of the electronic device having operated in the sleep mode in a particular place) about the electronic device.

In operation 1620, the electronic device may produce information (or values) indicating the relevancy among information/data elements for a plurality of metadata stored in the third database (e.g., the image/metadata database 412) or a memory (e.g., the memory 130, 230, or 430) functionally connected with the electronic device. The electronic device may produce the information (or values) indicating the relevancy among the information/data elements based on the first database (e.g., at least one of the ontology database 411 or the metadata model database 413) defining the plurality of information/data elements and relations among the plurality of information/data elements.

In operation 1630, the electronic device may store the produced information (or values) as metadata models (e.g., the metadata models 702 and 704). For example, the electronic device may store the metadata models in the first database.

Figure 17:
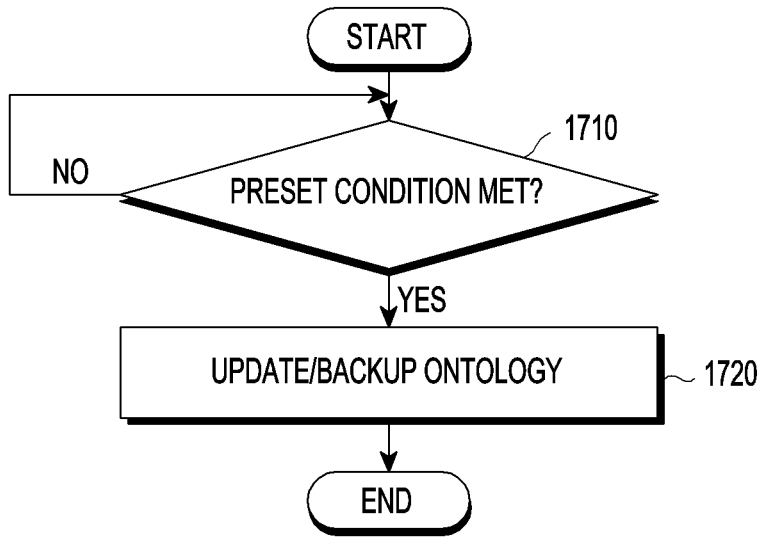
FIG. 17 is a flowchart illustrating an ontology update/backup method on an electronic device according to various embodiments.

FIG. 17 is a flowchart illustrating an ontology update/backup method on an electronic device according to various embodiments. The ontology update/backup method of the electronic device may include operations 1710 and 1720. The ontology update/backup method of the electronic device may be performed by at least one of the electronic device (e.g., the electronic device 101, 201, or 401) or a controller or processor (e.g., the processor 120, 210, or 410) of the electronic device.

In operation 1710, the electronic device may determine whether preset conditions are met. The electronic device may perform operation 1720 upon meeting the preset conditions, or otherwise upon failing to meet the preset conditions, periodically/aperiodically repeat operation 1710.

For example, the preset conditions may include at least one of arrival of a preset period, the usage of computing resources of the electronic device being not more than a preset threshold, the remaining battery life of the electronic device being not less than a preset threshold, the passage of a preset time from the last time that the ontology was updated/backed up, receiving an update/backup request from an external device (e.g., the first external electronic device 102, the second external electronic device 104, or the server 106), providing a service or function using an ontology, receiving a user input, the electronic device booting up, a transition from a sleep mode of the electronic device to a normal mode, the display screen/power-on after entry into the sleep mode of the electronic device, executing an application including a graphical element (or item) (e.g., at least one of a button, icon, menu, or menu item) requiring an ontology, displaying a screen including a graphical element requiring an ontology, the user's approach to a graphical element requiring an ontology, detecting a context associated with the electronic device that matches a preset context, or detecting at least one word matching at least one preset word.

In operation 1720, the electronic device may update the ontology or ontology database (e.g., the ontology database 411) or may back up the ontology or ontology database in an external device (e.g., the first external electronic device 102, the second external electronic device 104, or the server 106, ontology cloud storage). For example, the electronic device may receive a general-purpose ontology from the external device and integrate the received general-purpose ontology with a personal ontology.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to various embodiments, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments, and vice versa.

Modules or programming modules in accordance with various embodiments may include at least one or more of the aforementioned components, omit some of them, or further include other additional components. Operations performed by modules, programming modules or other components in accordance with various embodiments may be carried out sequentially, simultaneously, repeatedly, or heuristically. Furthermore, some of the operations may be performed in a different order, or omitted, or include other additional operation(s).

According to various embodiments, there is provided a storage medium storing commands configured to, when executed by at least one processor, enable the at least one processor to perform at least one operation that may include obtaining an image, integrating recognition information about the image with information related to the image, and storing the integrated information as metadata of the image or providing a service or a function using the integrated information.

The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

The invention claimed is:

1. A method for processing metadata by an electronic device, the method comprising:
    obtaining an image;
    obtaining recognition information about the image based on an analysis of the image;

obtaining image-related information extrinsically from the analysis of the image, wherein the obtained image-related information comprises at least one of user information, context information, or search information;

integrating the obtained recognition information about the image with the obtained image-related information based on a plurality of information elements and a relation among the plurality of information elements;

integrating text elements of the integrated information based on a database defining the plurality of information elements and the relation among the plurality of information elements;

comparing respective evaluation values for combinations of the text elements;

determining one of the combinations of the text elements as a title of the image based on the comparison; and storing the integrated information as metadata of the image or providing a service or a function using the integrated information.

2. The method of claim 1, wherein the integrating of the obtained recognition information with the obtained image-related information includes integrating the obtained recognition information with the obtained image-related information based on a database defining the plurality of information elements and the relation among the plurality of information elements.

3. The method of claim 1,
wherein the obtained image-related information includes text, and
wherein the method further comprises:
  splitting the text into a plurality of text elements based on a database defining the plurality of information elements and the relation among the plurality of information elements; and
  allowing the plurality of text elements to correspond to categories in the database.

4. The method of claim 1, further comprising:
determining whether a preset condition is met;
upon meeting the preset condition, producing values indicating relevancy among information elements for a plurality of metadata stored in a memory of the electronic device; and
storing the produced values as metadata model.

5. The method of claim 1, further comprising estimating information about the image based on values indicating relevancy among information elements for a plurality of metadata stored in a memory of the electronic device.

6. The method of claim 1, further comprising updating a database defining the plurality of information elements and the relation among the plurality of information elements using at least part of the obtained recognition information or the obtained image-related information.

7. The method of claim 1, further comprising:
displaying information elements of a first group among a plurality of information elements in a database defining the plurality of information elements and the relation among the plurality of information elements, in response to a first input; and
displaying images stored in a memory of the electronic device related to a first information element among the information elements of the first group, in response to a second input.

8. The method of claim 7, further comprising:
displaying information elements of a second group among the plurality of information/data elements related to the first information element, in response to a third input; and
displaying the images stored in the memory of the electronic device related to the first information element and a second information element among the information elements of the second group, in response to a fourth input.

9. The method of claim 1, further comprising:
receiving a keyword;
producing at least one recommended keyword by integrating the keyword with at least one information element in a database defining the plurality of information elements and the relation among the plurality of information elements;
displaying the keyword together with the at least one recommended keyword; and
in response to selecting one of the at least one recommended keyword, displaying images including the selected recommended keyword in metadata among images stored in a memory of the electronic device.

10. An electronic device, comprising:
a memory; and
a processor configured to:
  obtain an image,
  obtain recognition information about the image based on an analysis of the image,
  obtain image-related information extrinsically from the analysis of the image, wherein the obtained image-related information comprises at least one of user information, context information, or search information,
  integrate the obtained recognition information about the image with the obtained image-related information based on a plurality of information elements and a relation among the plurality of information elements,
  integrate text elements of the integrated information based on a database defining the plurality of information elements and the relation among the plurality of information elements,
  compare respective evaluation values for combinations of the text elements,
  determine one of the combinations of the text elements as a title of the image based on the comparison, and
  store the integrated information as metadata of the image in the memory or provide a service or a function using the integrated information.

11. The electronic device of claim 10, wherein the processor is configured to integrate the obtained recognition information with the obtained image-related information based on a database defining the plurality of information elements and the relation among the plurality of information elements.

12. The electronic device of claim 10, wherein the processor is configured to:
split text contained in the obtained image-related information into a plurality of text elements based on a database defining the plurality of information elements and the relation among the plurality of information elements, and
allow the plurality of text elements to correspond to categories in the database.

13. The electronic device of claim 10, wherein the processor is configured to determine whether a preset condition is met, upon meeting the preset condition, produce values indicating relevancy among information elements for a plurality of metadata stored in the memory, and store the produced values as a metadata model.

14. The electronic device of claim 10, wherein the processor is configured to display information elements of a first group among a plurality of information elements in a database defining the plurality of information elements and the relation among the plurality of information elements, in response to a first input and display images stored in a memory of the electronic device related to a first information element among the information elements of the first group, in response to a second input.

15. The electronic device of claim 14, wherein the processor is configured to:
   display information elements of a second group among the plurality of information related to the first information element, in response to a third input, and
   display the images stored in the memory related to the first information element and a second information element among the information elements of the second group, in response to a fourth input.

16. The electronic device of claim 10, wherein the processor is configured to estimate information about the image based on values indicating relevancy among information elements for a plurality of metadata stored in the memory.

17. The electronic device of claim 10, wherein the processor is configured to update a database defining the plurality of information elements and the relation among the plurality of information elements using at least part of the obtained recognition information or the obtained image-related information.

18. The electronic device of claim 10, wherein the processor is configured to:
   receive a keyword,
   produce at least one recommended keyword by integrating the keyword with at least one information element in a database defining the plurality of information elements and the relation among the plurality of information elements,
   display the keyword together with the at least one recommended keyword, and
   in response to selecting one of the at least one recommended keyword, display images including the selected recommended keyword in metadata among images stored in the memory.

* * * * *